(12) United States Patent
Guazzoni et al.

(10) Patent No.: US 11,364,582 B2
(45) Date of Patent: Jun. 21, 2022

(54) TOOL-HOLDER UNIT OF A MACHINE FOR MACHINING BLOCK OR SLAB MATERIALS, MACHINE INCLUDING SUCH UNIT AND METHOD FOR MACHINING BLOCK OF SLAB MATERIALS

(71) Applicant: GMM S.p.A.

(72) Inventors: Simone Guazzoni, Gravellona Toce (IT); Maurizio Gnappa, Gravellona Toce (IT); Riccardo Medina, Gravellona Toce (IT)

(73) Assignee: GMM S.p.A.

( * ) Notice: Subject to any disclaimer, the term of this patent is extended or adjusted under 35 U.S.C. 154(b) by 0 days.

(21) Appl. No.: 17/296,585

(22) PCT Filed: Nov. 29, 2019

(86) PCT No.: PCT/IB2019/060315
§ 371 (c)(1),
(2) Date: May 25, 2021

(87) PCT Pub. No.: WO2020/110073
PCT Pub. Date: Jun. 4, 2020

(65) Prior Publication Data
US 2021/0354258 A1    Nov. 18, 2021

(30) Foreign Application Priority Data

Nov. 30, 2018    (IT) .................... IT102018000010747

(51) Int. Cl.
*B23Q 3/12*    (2006.01)
*B23Q 3/157*    (2006.01)
(Continued)

(52) U.S. Cl.
CPC .......... *B23Q 3/15713* (2013.01); *B23Q 3/12* (2013.01); *B27B 5/32* (2013.01); *B28D 1/043* (2013.01)

(58) Field of Classification Search
CPC ...... B23Q 3/15713; B23Q 3/12; B23Q 3/152; B23Q 1/0072; B27B 5/32; B28D 1/043;
(Continued)

(56) References Cited

U.S. PATENT DOCUMENTS 3,791,022 A * 2/1974 Kurimoto .......... B23Q 3/15713
                                                     483/35
4,907,337 A * 3/1990 Krusi .................... B23B 31/265
                                                     144/2.1
(Continued)

FOREIGN PATENT DOCUMENTS

GB        664443 A    1/1952
GB       1579917 A   11/1980
WO    2013008154 A1   1/2013

OTHER PUBLICATIONS

Chinese Office Action dated Dec. 22, 2021, issued in corresponding Chinese application.

*Primary Examiner* — Chwen-Wei Su
(74) *Attorney, Agent, or Firm* — Husch Blackwell LLP

(57) ABSTRACT

A tool-holder unit for machining block or slab materials is moveable above a working plane on which the block or slab material is laid. The tool-holder unit includes a spindle with a circular blade and a coupling assembly that couples a second machining tool with the spindle. The tool-unit further includes a tool-holder; a mechanical coupling device configured to rotationally integrate the tool-holder and the spindle; a first axial locking element configured to removably lock the tool-holder on the spindle; a substantially cylindrical shank extending from the tool-holder; a substantially cylindrical housing seat axially positioned in the
(Continued)

spindle or a tool-holder coupling element; and a second axial locking element configured to removably lock the tool-holder in the spindle, the axial locking element being configured to removably lock the shank in the respective housing seat.

35 Claims, 15 Drawing Sheets

(51) Int. Cl.
     *B27B 5/32*      (2006.01)
     *B28D 1/04*      (2006.01)

(58) Field of Classification Search
     CPC . B23B 31/1071; B23B 31/263; Y10S 279/90; Y10S 483/902; Y10T 279/17145; Y10T 483/1809
     See application file for complete search history.

(56) References Cited

U.S. PATENT DOCUMENTS

| | | |
|---|---|---|
| 5,409,322 A * | 4/1995 | Horikawa ............. B23B 31/265 |
| | | 279/89 |
| 7,581,470 B1 | 9/2009 | Huang |
| 2007/0182109 A1 | 8/2007 | Considine et al. |
| 2017/0239833 A1* | 8/2017 | Mazzaccherini ........ B26D 3/16 |

* cited by examiner

TOOL-HOLDER UNIT OF A MACHINE FOR MACHINING BLOCK OR SLAB MATERIALS, MACHINE INCLUDING SUCH UNIT AND METHOD FOR MACHINING BLOCK OF SLAB MATERIALS

CROSS REFERENCES

This application is a U.S. National Phase Application of International Application No. PCT/IB/2019/060315 filed on Nov. 29, 2019, which claims priority to Italian Patent Application No. 102018000010747 filed Nov. 30, 2018. The disclosures of International Application No. PCT/IB/2019/060315 and Italian Application No. 102018000010747 are incorporated herein by reference in their entirety.

BACKGROUND OF THE INVENTION

The present invention relates to a tool-holder unit of a machine for machining block or slab materials, in particular, but not exclusively, stone materials, such as, for example, marble and granite, or similar materials of a non-natural character. Preferably, these materials are in slab form.

The invention also relates to a machine for machining block or slab materials including such a tool-holder unit and to a method for machining block or slab materials, which method can be implemented by means of such machine. Preferably, these materials are in slab form.

The term "machining" as used herein generally indicates any operation performed on a piece of material (block or slab), such as cutting, drilling, milling, squaring, shaping, or the like.

PRIOR ART

Machines for machining block or slab materials, and in particular stone materials, essentially comprise a table which defines a working plane on which the block or slab to be machined is laid, a tool-holder unit to which a machining tool, for example a circular blade or a mill, is associated, a displacing apparatus of the tool-holder unit and a drive and control unit equipped with a suitable operator interface.

In the present description and in the attached claims, the term "displacing apparatus", is used to indicate an apparatus configured to cause any movement of the tool-holder unit, be it a translation or a rotation movement.

The tool-holder unit has a plurality of supply lines connected thereto, for example an electrical line or a line for feeding a cooling fluid to the machining tool. The displacing apparatus is mounted on a horizontal bridge which rests on walls or other vertical supporting structures. In other possible embodiments, the displacing apparatus can be connected to an anthropomorphic robot or to other types of machine suitable for the purpose.

The bridge is mobile on the respective support structures and the displacing apparatus is mobile along the bridge. In this way, the displacing apparatus and the tool-holder unit can be moved parallel to the working plane along two axes X and Y perpendicular to each other. In turn, the displacing apparatus can move the tool-holder unit along a further direction of displacement Z perpendicular to the working plane. In order to carry out machining operations along both the directions of displacement X and Y as well as along oblique directions, it is also foreseen to rotate the tool-holder unit about the axis Z, in practice the vertical axis, so as to arrange the piece of material to be machined (block or slab) with respect to the machining tool according to different angles.

The machining operations which the piece of material is subjected to may comprise cutting the material by means of a circular blade, plus other kinds of machining operations (drilling, squaring, shaping, etc.) to be carried out by means of additional machining tools, such as drills and mills of different types and sizes.

Generally, these additional tools are mounted on suitable tool-holders, which are associated to the tool-holder unit of the aforementioned machine, carrying the circular blade, by means of a suitable coupling assembly.

In particular, the tool-holder unit comprises a spindle on which the circular blade is mounted and the aforementioned tool-holders (carrying the different additional tools) are removably coupled to a front free end of the aforementioned spindle.

To this end, in a known machine the tool-holder unit is in particular equipped with a mechanical coupling device provided with elements cooperating in abutment relationship to make the tool-holder and the spindle rotationally integral with each other, for example comprising a plurality of driving pegs and a corresponding plurality of peg housing seats, and provided with a magnet made in a tool-holder coupling element associated to the spindle and capable of adhering the tool-holder to the coupling element.

In this way, it is possible to arrange different additional tools, each mounted on a respective tool-holder, in a suitable storage device, for example substantially of the rack type, positioned close to the machine, so that these additional tools can be quickly assembled/disassembled from the tool-holder unit, according to the machining operations which need to be carried out on the piece of material.

In more recent machines for machining block or slab materials, it has been thought of automating the assembling/disassembling operations of the aforementioned tool-holders on the tool-holder unit.

To this end, it is necessary to position in perfect alignment the elements cooperating in abutment relationship which form the aforesaid mechanical coupling device (for example, of the pegs with respect to the respective housing seats).

A particularly effective way of achieving this perfect alignment is disclosed in International patent application No. WO 2013/008154 in the name of the same Applicant which discloses a tool-holder unit in which the coupling assembly comprises a plurality of magnets with north polarity and south polarity associated to the front free end of the spindle and to a free end of the tool-holder and appropriately offset from each other.

Thanks to this configuration, the coupling assembly allows to achieve an effective automatic self-centring of the elements which constitute the same, simplifying the structure of the devices for positioning and moving the spindle and speed up the assembling/disassembling operations of the tool-holders on the tool-holder unit.

In recent times and due to production and market requirements, it is increasingly required that the tool-holder unit can allow—by means of the aforesaid additional machining tool—a machining of the material along a transversal direction with respect to the working plane, thereby generating forces acting along the transversal direction with respect to the rotation axis of this additional tool.

An example of this type of machining is the milling operations of the material, analogous considerations also applying for other machining operations where stresses are exerted along a transversal direction with respect to the rotation axis of the tool.

The Applicant has found that in this type of machining, for example the milling one, a force is generated, acting transversely with respect to the rotation axis of the additional tool, which generates on the coupling between tool-holder and spindle (generally of the conical type) a tilting moment which tends to separate the fixing surfaces of tool-holder and spindle from each other.

The Applicant has observed that, with the tool-holder unit disclosed by WO 2013/008154, the forces normally generated by a milling operation are such that the magnets alone are already able to counteract the aforesaid tilting moment and ensure a correct coupling between tool-holder and spindle.

However, it cannot be excluded that, for various reasons, the tool-holder may be required to withstand higher transversal stresses, even sudden ones, with respect to the rotation axis of the tool (for example due to an operator's error and/or to a worn tool and/or to a discontinuity in the material and/or to accidental impacts during positioning, etc.).

The Applicant has in fact found that in these situations of higher stresses exerted on the tool along the transversal direction, in particular in machining operations with progressively greater values of the advancing speed of the tool in the material, the tool-holder and the spindle can first be moved slightly away from each other causing an eccentric rotation, vibrations and machining out of tolerance and, as the stresses increase, a complete detachment of the tool-holder can even occur.

Obviously this latter situation is to be avoided both for economic reasons (damages on the machinery and on the material being machined) and above all for reasons of operator's safety given the risks connected to a possible detachment of the tool-holder unit, having a not negligible weight, even in the presence of the usual passive safety means (for example, shatterproof barriers) with which the machines are equipped.

SUMMARY OF THE INVENTION

The Applicant has found that the tool-holder unit of the machine for machining block or slab materials disclosed by WO 2013/008154 may be subject to an improvement which is particularly useful during the aforesaid mechanical machining performed by means of a working tool having the same rotation axis as the spindle, or a rotation axis parallel thereto, with stresses acting along a transversal direction with respect to the rotation axis of the tool, i.e. stresses exerted along a radial direction with respect to the longitudinal axis of the tool, for example a milling, flattening, notching machining, etc.

The Applicant has therefore perceived the possibility of improving the tool-holder unit disclosed by WO 2013/008154 and, more particularly, the possibility of providing a tool-holder unit of a machine for machining block or slab materials, as well as a machine which incorporates such a unit and a method for machining block or slab materials, which allow an extension of the types of machining that can be carried out correctly and safely by the same additional tool even in the presence of high stresses, even sudden ones, acting along a transversal direction with respect to the rotation axis of this additional tool.

In particular, according to a first aspect, the present invention relates to a tool-holder unit of a machine for machining block or slab materials according to claim 1.

More particularly, the invention relates to a tool-holder unit of a machine for machining block or slab materials, said tool-holder unit being moveable above a working plane of said machine on which the block or slab material to be machined is laid, wherein the tool-holder unit comprises:
  a spindle on which a circular blade can be mounted, and
  a coupling assembly for removably coupling a second machining tool to a front free end of the spindle, comprising:
  a) a tool-holder associated to the second machining tool;
  b) at least one mechanical coupling device provided with elements cooperating in abutment relationship to make the tool-holder and the spindle rotationally integral with each other; and
  c) a first axial locking element of the tool-holder configured to removably lock in translation and in a substantially axial direction said tool-holder on the spindle, said first axial locking element comprising a magnetic fixing device of the tool-holder to the spindle;
  which is characterised in that said coupling assembly further comprises:
  d) a substantially cylindrical shank extending from said free end of the tool-holder;
  e) a substantially cylindrical housing seat of said shank, axially positioned in said spindle or, if present, in a tool-holder coupling element associated to the front free end of the spindle; and
  f) at least a second axial locking element of the tool-holder, configured to removably lock in translation and in a substantially axial direction said tool-holder in the spindle, said at least a second axial locking element being translationally movable in radial direction to removably lock said shank in the respective housing seat.

Advantageously, the tool-holder unit of the invention, and in particular the coupling assembly thereof, comprises a second axial locking element of the tool-holder which intervenes in any condition of high stress, even sudden one, acting along a transversal direction with respect to the rotation axis of the second machining tool, preventing the tool-holder from detaching from the spindle whatever the extent of the transversal stress.

In particular, the second axial locking element removably locks the shank of the tool-holder in the respective housing seat, thus ensuring effective active safety conditions of the machine.

In particular, the tool-holder unit of the invention advantageously allows to prevent an accidental detachment of the tool-holder from the spindle, under all those operating conditions in which the second machining tool must withstand even higher transversal stresses, evens sudden ones, (for example, due to an operator's error and/or to a worn tool and/or to a discontinuity in the material and/or to accidental impacts in positioning, etc.).

Moreover, the second axial locking element may be advantageously translated along a radial direction in a completely automated cycle of tool-holder change.

In a second aspect thereof, the present invention relates to a machine for machining block or slab materials according to claim 22.

In particular, the invention relates to a machine for machining block or slab materials, comprising a working plane on which the block or slab material to be machined is laid and a tool-holder unit according to the first aspect of the present invention.

Preferably, this machine for machining block or slab materials therefore has all the structural and functional features discussed above with reference to the tool-holder unit of the first aspect of the invention and therefore has all the advantages achieved therefrom and disclosed in the present description.

In a third aspect thereof, the present invention relates to a method for machining block or slab materials according to claim 26.

In particular, the invention relates to a method for machining block or slab materials comprising the steps of:
- A) arranging a block or slab material on a working plane,
- B) moving a tool-holder unit, comprising a spindle on which a circular blade is mounted, above the working plane,
- C) carrying out a cutting operation on said block or slab material by means of said circular blade,
- D) rotating the tool-holder unit about an axis substantially parallel to the working plane,
- E) removably coupling a second machining tool to a front free end of the spindle of the tool-holder unit by means of a coupling assembly comprising:
  - a) a tool-holder associated to the second machining tool;
  - b) at least one mechanical coupling device provided with elements cooperating in abutment relationship to make the tool-holder and the spindle rotationally integral with each other; and
  - c) a first axial locking element of the tool-holder configured to removably lock in translation and in a substantially axial direction said tool-holder on the spindle, said first axial locking element comprising a magnetic fixing device of the tool-holder to the spindle;
- F) carrying out an additional machining on said block or slab material by means of said second machining tool, characterised in that the coupling assembly further comprises:
- d) a substantially cylindrical shank extending from said free end of the tool-holder;
- e) a substantially cylindrical housing seat of said shank, axially positioned in said spindle or, if present, in a tool-holder coupling element associated to the front free end of the spindle; and
- f) at least a second axial locking element of the tool-holder, configured to removably lock in translation and in a substantially axial direction said tool-holder in the spindle, said at least a second axial locking element being translationally movable in radial direction to removably lock said shank in the respective housing seat;

and in that said step E) comprises the steps of:
- E1) moving the spindle towards the tool-holder,
- E2) orienting in alignment with each other the elements cooperating in abutment relationship of the mechanical coupling device of the coupling assembly,
- E3) inserting said substantially cylindrical shank of the tool-holder in said housing seat axially formed in the spindle or, if present, in the tool-holder coupling element associated to the front free end of the spindle;
- E4) magnetically associating the spindle or, if present, the tool-holder coupling element associated to the front free end of the spindle, with the tool-holder by means of said first axial locking element; and
- E5) translating said at least a second axial locking element of the tool-holder in radial direction to removably lock the shank of the coupling assembly in the respective housing seat.

Preferably, this method for machining block or slab materials is carried out by means of the tool-holder unit of the first aspect of the invention described above, having all the structural and functional features discussed herein with the respective advantages.

In particular, the method of the invention advantageously comprises translating a second axial locking element of the tool-holder in radial direction to removably lock the shank of the coupling assembly of the second machining tool in the respective housing seat.

The second axial locking element of the tool-holder intervenes in any condition of high stress, even sudden one, acting along a transversal direction with respect to the rotation axis of the second machining tool, preventing the tool-holder from detaching from the spindle whatever the extent of the transversal stress.

In particular, the second axial locking element removably locks the shank of the tool-holder in the respective housing seat, thereby ensuring effective active safety conditions of the machine.

In particular, the method of the invention advantageously allows to avoid an accidental detachment of the tool-holder from the spindle, under all those operating conditions in which the second machining tool must withstand higher transversal stresses, even sudden ones (for example, due to an operator's error and/or to a worn tool and/or to a discontinuity in the material and/or to accidental impacts in positioning, etc.).

Moreover, the second axial locking element may advantageously be translated in a radial direction in a completely automated cycle of tool-holder change.

The present invention in at least one of the aforesaid aspects may have at least one of the following preferred features; the latter may in particular be combined with one another as desired in order to meet specific application needs.

In a preferred embodiment of the invention, said at least a second axial locking element of the tool-holder comprises at least one locking ball mounted in said shank, which at least one locking ball being radially movable on command between:
- a retracted, releasing position of the shank, wherein said at least one locking ball does not project from the shank, and
- an extracted, locking position of the shank, wherein said at least one locking ball at least partially projects from the shank and is at least partially housed in a corresponding first housing seat formed in said substantially cylindrical housing seat of the shank.

Advantageously, the use of at least one locking ball that is movable substantially radially between the retracted position and the extracted position allows to achieve reliability characteristics of the operation of the second axial locking element of the tool-holder over time.

Preferably, said tool-holder comprises a driving element of said at least a second axial locking element of the tool-holder movable along the axial direction of the tool-holder and configured to be actuated from the outside of the tool-holder.

Advantageously, this driving element does not affect the radial dimensions of the tool-holder unit and also advantageously allows to command the second axial locking element from the outside in a completely automated cycle of tool-holder change.

Preferably, said driving element comprises a driving stem, slidably mounted in axial direction in said tool-holder between:
- a first, locking position of the shank, wherein the driving stem urges said at least one locking ball in said extracted position in which the locking ball at least partially projects from the shank; and a second, releasing position of the shank, wherein said at least one locking ball is in said retracted position and is at least partially housed in a respective second housing seat formed in said driving stem.

Preferably, said second housing seat of the locking ball formed in the driving stem is formed in a first end portion of the driving stem.

Preferably, said driving stem is slidably mounted in a through cavity centrally formed in said tool-holder.

Advantageously, each of the aforesaid preferred features of the driving stem allows to manoeuvre the aforesaid at least one locking ball in a reliable, simple and direct manner.

Preferably, said driving element comprises an elastic element which is active along a thrust direction adapted to keep said driving stem in said first locking position of the shank.

Advantageously, the elastic element is configured to constantly maintain during the use of the tool-holder unit the shank in the aforesaid locking position, so as to maintain the desired axial locking of the tool-holder under safe conditions and require a positive release action of the tool-holder by acting in opposite direction to the thrust direction of the elastic element.

Preferably, said elastic element of the driving element is a helical spring mounted in a respective annular housing seat defined in said shank between an inner wall of said through cavity formed in the tool-holder and an outer wall of said driving stem.

More preferably, said helical spring comprises opposite ends which are active on a first annular shoulder extending from the inner wall of said through cavity and, respectively, on a second annular shoulder extending from the outer wall of said driving stem.

In this way, the thrust action of the elastic element is advantageously guided in a correct manner so as to exploit the elastic thrust force of this element in the best possible way.

In a preferred embodiment of the invention, the driving element of said at least a second axial locking element of the tool-holder comprises an actuation head fixed to an end portion of the driving stem externally positioned with respect to the housing seat of said substantially cylindrical shank.

In this way, the driving element of the second axial locking element of the tool-holder can be easily commanded by means of the aforesaid actuation head, accessible from the outside of the tool-holder unit, facilitating the operations of changing the tool-holder, in particular those of an automated type.

Preferably, the actuation head of the driving element is slidably mounted on a cylindrical portion of said tool-holder opposite to said substantially cylindrical shank.

More preferably, the actuation head of the driving element is fixed to the end portion of said driving stem externally positioned with respect to the housing seat of the substantially cylindrical shank by means of a fixing element slidably guided in a through slot formed in said cylindrical portion of said tool-holder.

In this way, the axial sliding of the actuation head of the driving element can advantageously be guided in a correct manner.

In a preferred embodiment of the invention, the actuation head of the driving element comprises an external recess configured to be engaged by a manoeuvring tool of the actuation head.

In this way, it is advantageously possible to facilitate the manoeuvring operations of the driving element, which can be performed from the outside of the tool-holder unit by acting on the aforesaid actuation head.

Preferably, said manoeuvring tool comprises an arm provided with a tapered end portion configured to engage said external recess of the actuation head of the driving element and to drive in translation the driving stem of the driving element towards said second releasing position of the shank.

Thanks to this feature and as will become more apparent hereinafter, it is advantageously possible to operate the driving element in a simple, repeatable and effective manner, for example and preferably, in a completely automated cycle of tool-holder change.

In a preferred embodiment, said tool-holder comprises a coupling flange at the front free end of the spindle or, if present, at said tool-holder coupling element associated to the front free end of the spindle.

In this preferred configuration of the tool-holder unit, the actuation head of the driving element of the second axial locking element of the tool-holder preferably abuts against the coupling flange of the tool-holder when said driving stem of the driving element is in said first locking position of the shank.

In a preferred embodiment of the invention, said coupling assembly further comprises a frusto-conical guide, coaxially extending from said tool-holder, and a corresponding frusto-conical seat, formed in said front free end of the spindle or, if present, in said tool-holder coupling element associated to the front free end of the spindle.

Advantageously, the frusto-conical guide and the corresponding frusto-conical seat allow to effectively centre the tool-holder in the spindle, obtaining a coupling with perfect coaxiality between the latter (i.e. between tool-holder and tool-holder coupling element).

Advantageously, the frusto-conical guide also allows to realize the second axial locking element of the tool-holder, for example the aforesaid locking ball and the respective housing seat, without resorting to stringent machining tolerances with an advantageous manufacturing simplification and cost reduction.

Preferably, said substantially cylindrical shank coaxially extends from said frusto-conical guide.

In a preferred embodiment of the invention, said magnetic fixing device of the tool-holder to the spindle comprises:

c1) at least a first magnet arranged at said front free end of the spindle or, if present, at a tool-holder coupling element associated to the front free end of the spindle, and c2) at least a second magnet arranged at said free end of the tool-holder.

Even more preferably, the said magnetic fixing device of the tool-holder to the spindle comprises:

at least two first magnets with north polarity and at least two first magnets with south polarity, associated to the front free end of the spindle or, if present, to said tool-holder coupling element associated to the front free end of the spindle, and circumferentially arranged alternating with each other at said front free end or, if present, at said tool-holder coupling element, and at least two second magnets with south polarity and at least two second magnets with north polarity, associated to a free end of said tool-holder and circumferentially arranged alternating between each other at said free end of the tool-holder.

Advantageously, the coupling assembly of the tool-holder unit of the invention thus features automatic self-centring features of the elements that constitute the same, which greatly simplify the structure of the positioning and moving devices of the spindle and speed up the assembly/disassembly operations of the tool-holders on the tool-holder unit.

All this as is more amply described in the aforesaid International application WO 2013/008154 in the name of the Applicant the content of which is herein incorporated by reference.

Thanks to the features of the aforesaid coupling assembly, in fact, the elements cooperating in abutment relationship which form the mechanical coupling device (for example, pegs extending from the tool-holder and respective housing seats formed in the spindle) are positioned in perfect mutual alignment in a very rapid and precise manner by simply bringing the spindle closer to the tool-holder.

The magnetic fields generated by the magnets associated to the free end of the tool-holder and to the front free end of the spindle, in fact, cause a rotation of the tool-holder, and/or of the spindle in the preferred embodiments in which it is configured for a free rotation around its own longitudinal axis, which brings in perfect alignment with each other both the magnets of opposite polarity associated to the spindle and to the tool-holder, and the elements cooperating in abutment relationship which form the mechanical coupling device (for example the driving pegs and the respective associated housing seats at the free end of the tool-holder and at the front free end of the spindle).

In practice, as a consequence of the mutual approach of the spindle and of the tool-holder, the tool-holder and/or the spindle rotate about themselves until the magnets of opposed polarity associated to the spindle and to the tool-holder are brought in mutual alignment, while a subsequent approach between the spindle and the tool-holder brings the respective magnets with opposite polarities to magnetically interact with each other (with or without physical contact) improving the coupling of the machining tool associated to the tool-holder with the spindle of the machine for machining the material.

At the same time, a perfect mutual alignment of the elements cooperating in abutment relationship which form the mechanical coupling device (for example the driving pegs and the respective housing seats associated to the free end of the tool-holder and to the front free end of the spindle) takes place.

In this way, the assembly of the various tool-holders on the spindle is not only extremely simple and rapid, but it is also obtained with a tool-holder unit that is mechanically simple and inexpensive (position sensors and inverters, in fact, are not required).

In addition, the tool-holder unit of the present invention also achieves improved reliability characteristics since its operation in the automatic tool change is not subject to possible failures of the positioning sensors and of the inverter.

According to this preferred embodiment of the invention, the circumferential alternation of the magnets at the front free end of the spindle and at the free end of the tool-holder can be achieved both by individually alternating the magnets of opposite polarity according to a north-south scheme, and alternating groups of magnets having opposite polarity, for example according to a north-north/south-south pattern.

The specific arrangement of the circumferential alternation of the magnets and the number of magnets included in each of the aforementioned groups can be determined by a man skilled in the art as a function of the characteristics and of the overall number of magnets so as to achieve the desired automatic alignment between the elements which constitute the coupling assembly in the manner illustrated in the aforesaid International application WO 2013/008154 in the name of the Applicant the content of which is herein incorporated by reference.

Preferably, said at least two first magnets with north polarity and said at least two first magnets with south polarity are associated to a coupling flange of the tool-holder coupling element and said at least two second magnets with south polarity and said at least two second magnets with north polarity are associated to said coupling flange of the tool-holder.

In this way, it is advantageously possible to arrange a suitable number of magnets along a circular crown defined between two inner circumferences of the flanges.

Moreover, it is advantageously possible to facilitate the achievement of the desired orientation of the tool-holder with respect to the spindle, by reducing the amount of rotation of the tool-holder with respect to the spindle itself.

Preferably, the tool-holder coupling element comprises a threaded cylindrical portion coupled by screwing into a corresponding cylindrical seat provided in the front free end of the spindle.

This type of coupling between the tool-holder coupling element and the spindle has the advantage of being simple, cheap and effective.

In a preferred embodiment of the invention, the elements cooperating in abutment relationship of said at least one mechanical coupling device comprise:
  a plurality of driving pegs axially extending from one of
    said free end of the tool-holder and said front free end
    of the spindle or, if present, said tool-holder coupling
    element associated to the front free end of the spindle,
    and
  a corresponding plurality of housing seats of said driving
    pegs, formed in the other of said free end of the
    tool-holder and said front free end of the spindle or, if
    present, said tool-holder coupling element associated to
    the front free end of the spindle.

In this way, it is advantageously possible to couple and make the spindle and tool-holder rotatably integral with each other in a mechanically very simple manner.

Preferred features and respective advantages of the elements cooperating in abutment relationship of said at least one mechanical coupling device are illustrated in the aforesaid International application WO 2013/008154 in the name of the Applicant the content of which is herein incorporated by reference.

In a preferred embodiment, the machine of the invention can comprise a handling unit coupled to said tool-holder unit and provided with gripping means of the block or slab material to be machined, wherein said gripping means are mobile between a first non-operative position, distal with respect to the working plane, and a second operative position, proximal with respect to the working plane, said gripping means being rotatable between said first non-operative position and said second operative position.

In this way, the machine of the invention is advantageously capable both to carry out machining with the circular blade on the block or slab material and to displace the latter in a very simple and rapid manner.

Preferred features and respective advantages of the handling unit are illustrated in the aforesaid International application WO 2013/008154 in the name of the Applicant the content of which is herein incorporated by reference.

In a preferred embodiment, the machine of the invention further comprises a tool storage area comprising a plurality of tool-holders storage stations associated to respective machining tools and said storage stations include a fork-shaped element for supporting the tool-holder provided with a manoeuvring tool of the actuation head of the driving element of said at least a second axial locking element of the tool-holder.

In this way, it is advantageously possible to implement a plurality of machining operations by using different tools which can be coupled to the spindle of the tool-holder unit in an extremely simple and rapid manner.

Preferably, said manoeuvring tool of the fork-shaped element comprises at least one arm of said fork-shaped element provided with a tapered end portion configured to engage an external recess of the actuation head of the driving element and to drive in translation the driving stem of the driving element of said at least one second axial locking element of the tool-holder towards said second releasing position of the shank.

Advantageously, thanks to this configuration of the arm of the manoeuvring tool of the fork-shaped element, a fully automated cycle of tool change can be carried out very quickly and easily, minimizing the moving parts.

Preferred features of the method of the invention are indicated below, by means of which the same advantages already discussed above are obtained with reference to the features of the tool-holder unit and of the machine of the invention.

In a preferred embodiment of the method, said at least a second axial locking element of the tool-holder comprises:
  at least one locking ball mounted in said shank which is radially movable on command between:
    a retracted, releasing position of the shank, wherein said at least one locking ball does not project from the shank, and
    an extracted, locking position of the shank, wherein said at least one locking ball at least partially projects from the shank and is at least partially housed in a corresponding first housing seat formed in said substantially cylindrical housing seat of the shank;
  the aforesaid tool-holder comprises:
  a driving element of said at least one locking ball comprising a driving stem, slidably mounted in axial direction in said tool-holder between:
    a first, locking position of the shank, wherein the driving stem urges said at least one locking ball in said extracted position in which the locking ball at least partially projects from the shank; and
    a second, releasing position of the shank, wherein said at least one locking ball is in said retracted position and is at least partially housed in a respective second housing seat formed in said driving stem, and
step E5) of translating said at least one second axial locking element of the tool-holder comprises: moving said driving stem towards said first locking position of the shank, wherein the driving stem urges said at least one locking ball in said extracted position in which the locking ball at least partially projects from the shank.

Preferably, the driving stem is moved towards said first locking position of the shank by a driving element comprising an elastic element active along a thrust direction adapted to keep the driving stem in said first locking position of the shank.

In a preferred embodiment of the method, said magnetic fixing device of the tool-holder to the spindle comprises:
  at least two first magnets with north polarity and at least two first magnets with south polarity, associated to the front free end of the spindle or, if present, to said tool-holder coupling element associated to the front free end of the spindle, and circumferentially arranged alternating with each other at said front free end or, if present, at said tool-holder coupling element, and
  at least two second magnets with south polarity and at least two second magnets with north polarity, associated to a free end of said tool-holder and circumferentially arranged alternating with each other at said free end of the tool-holder; and
step E4) of magnetically associating the spindle or, if present, the tool-holder coupling element associated to the front free end of the spindle, to the tool-holder comprises:
  a magnetic interaction between the second magnets associated to the free end of the tool-holder and the first magnets associated to the front free end of the spindle or, if present, to said tool-holder coupling element associated to the front free end of the spindle, said magnetic interaction being such as to orient in alignment with each other the elements cooperating in abutment relationship of the mechanical coupling device of the coupling assembly.

Preferably, the method of the invention further comprises a step G) of decoupling said second machining tool from said front free end of the spindle of the tool-holder unit or, if present, from said tool-holder coupling element associated to the front free end of the spindle, wherein said step G) comprises the steps of:
  G1) translating said at least a second axial locking element of the tool-holder in radial direction to removably unlock said shank from the respective housing seat;
  G2) extracting said shank from the respective housing seat;
  G3) detaching the tool-holder from the front free end of the spindle or, if present, from said tool-holder coupling element associated to the front free end of the spindle by moving the tool-holder away from said front free end or, if present, from said tool-holder coupling element associated to the front free end of the spindle.

Preferably, the step G1) comprises translating said at least one axial locking ball of the tool-holder in radial direction towards said retracted releasing position of the shank, wherein said at least one locking ball does not project from the shank.

Preferably, the step G1) of translating said at least one axial locking ball of the tool-holder in radial direction is carried out by moving the driving stem of the driving element towards said second, releasing position of the shank, wherein said at least one locking ball is at least partially housed in said respective second housing seat formed in the driving stem.

Preferably, the driving stem is moved towards said second releasing position of the shank compressing said elastic element along the thrust direction thereof.

Preferably, the method of the invention further comprises a step of storing a plurality of second machining tools and tool-holders associated thereto in a tool storage area comprising a plurality of storage stations of tool-holders associated to respective machining tools.

In a preferred embodiment of the method, the driving element of said at least a second axial locking element of the tool-holder comprises an actuation head fixed to an end portion of the driving stem externally positioned with respect to the housing seat of said shank and provided with an outer recess configured to be engaged by a manoeuvring tool of the actuation head;
  said storage stations include a fork-shaped element for supporting the tool-holder provided with said manoeuvring tool; and the driving stem is moved towards said second, releasing position of the shank, by engaging the manoeuvring tool of the fork-shaped element for supporting the tool-holder in said outer recess of the actuation head of the driving element of said at least a second axial locking element of the tool-holder.

Preferably, the manoeuvring tool of the fork-shaped element for supporting the tool-holder is engaged in said outer recess of the actuation head by laterally inserting said actuation head in the fork-shaped element.

Preferably, the manoeuvring tool of the fork-shaped element comprises at least one arm of said fork-shaped element provided with a tapered end portion configured to engage in said outer recess of the actuation head of the driving element.

BRIEF DESCRIPTION OF THE FIGURES

Additional features and advantages of the present invention will become more readily apparent from the following detailed description of a preferred embodiment thereof, given with reference to the attached drawings and provided by way of indicative and non-limiting example. In such drawings.

DETAILED DESCRIPTION

Figure 1:
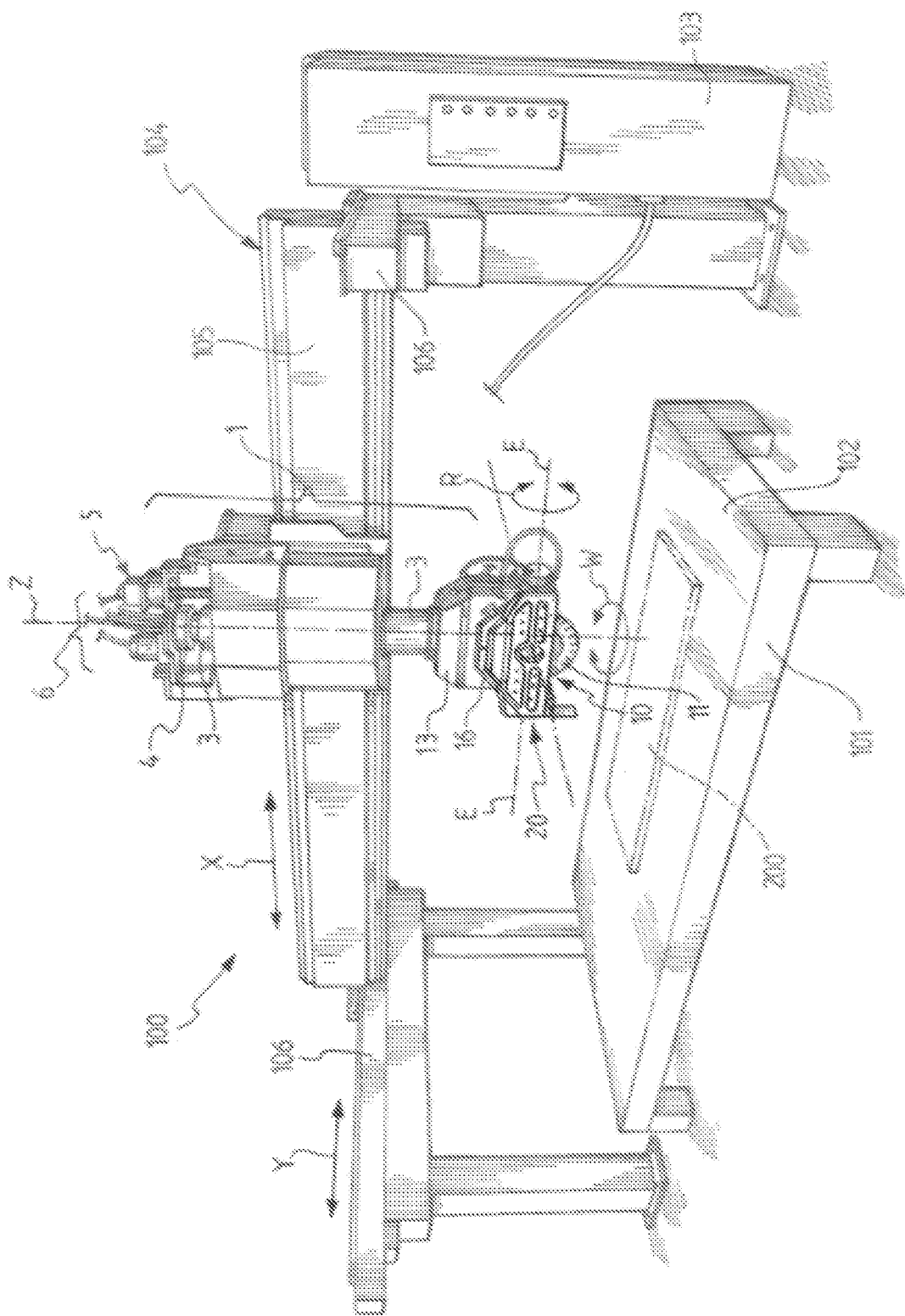
FIG. 1 is a schematic perspective view of a machine for machining block or slab materials according to the invention, wherein a respective tool-holder unit is devoid of the tool-holder.

With initial reference to FIG. 1, a machine for machining block or slab materials, in particular, but not exclusively, stone materials, according to a preferred embodiment of the invention is generally indicated at 100.

A table 101 is shown defining a working plane 102. The table can be stationary, such as in the illustrated example, or motorised and rotatable about a vertical rotation axis, not shown.

In general, the table 101 is not part of the machine 100; alternatively, the table 101 can be a component of the machine 100. The block or slab material to be machined is indicated with reference numeral 200.

In this preferred embodiment, the machine 100 comprises a tool-holder unit 10, a corresponding displacing apparatus 1 and a support structure 104.

The support structure 104 has, in this preferred embodiment, the function of keeping the tool-holder unit 10 and the corresponding displacing apparatus 1 suspended above the working plane 102, on which the material 200 is positioned.

In the preferred embodiment illustrated in the appended figures, the support structure 104 can for example comprise a bridge 105 which rests, at its ends, on walls 106 or other equivalent support structures, extending in a direction perpendicular to the bridge 105 itself.

The support structure 104 therefore preferably comprises at least the elements 105 and 106.

Preferably, the displacing apparatus 1 comprises a motorized trolley 2, adapted to move on the bridge 105 parallel to a longitudinal axis of the bridge 105 itself (i.e. in the direction indicated by X), and a shaft 3.

At the lower end of the shaft 3 a fork-shaped body 13, to which the tool-holder unit 10 is fixedly connected, is provided and at the upper end of the same shaft 3 a reduction gear 4, preferably with zero clearance, is located. The displacing apparatus 1 thus comprises at least the components 2, 3, 13.

The shaft 3 is movable along its longitudinal axis Z—extending in a substantially vertical direction in the use configuration of the machine 100—thanks to the presence of linear actuators 5 fixedly connected to the upper end of the shaft 3, for example fixedly connected at the reduction gear 4, and to the trolley 2. The apparatus 1 also has the function of guiding supply lines 6 towards the tool-holder unit 10.

The supply lines 6 preferably comprise at least one electrical supply line and at least one supply line for a fluid, for example water, intended to cool the machine tools of the tool-holder unit 10 during operation.

Preferably, the shaft 3 is hollow and the supply lines 6 are housed in a corresponding inner cavity.

Preferably, the displacing apparatus 1 is arranged to move the tool-holder unit 10 also in rotation about the axis Z. This rotation, imparted by a motor by interposing the reduction gear 4, is indicated by the arrow W.

In this preferred embodiment, therefore, the displacing apparatus 1 is movable along the bridge 105 and the latter is movable parallel to the extension direction Y of the walls 106. The displacing apparatus 1, and along therewith the tool-holder unit 10, can therefore be moved parallel to the direction of extension Y of the walls 106. The displacing apparatus 1, and along therewith the tool-holder unit 10, may therefore be moved parallel to the working plane 102 along two axes perpendicular to each other (directions X and Y) and, as explained above, may be moved parallel to the axis Z and rotated about this axis (rotation W).

In the preferred embodiment illustrated, a first machining tool is associated to the tool-holder unit 10, for example a circular blade 11, to perform cutting operations.

Figure 6:
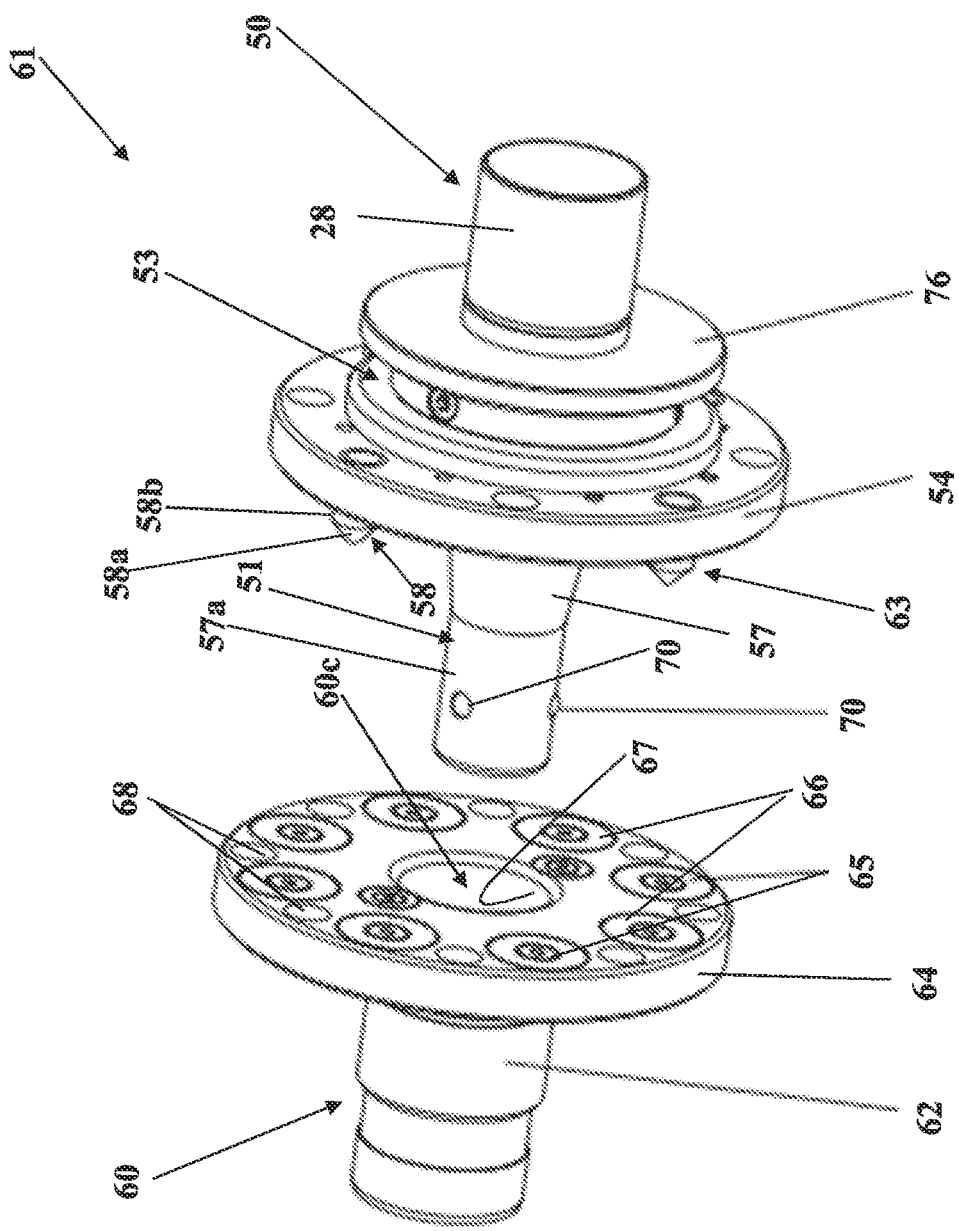
FIG. 6 is an exploded schematic perspective view of the tool-holder unit according to the invention, wherein a tool-holder and a tool-holder coupling element can be seen.

Furthermore, a tool-holder 50 (FIGS. 6, 7) of a second machining tool, schematically indicated in FIG. 6 with reference numeral 28, for example an end mill, a grinder, a drill bit, etc., may be removably coupled to the tool-holder unit 10.

The tool-holder 50 and the procedures for its coupling to the tool-holder unit 10 according to a preferred embodiment of the present invention will be described hereinbelow, with specific reference to FIGS. 6-16.

With reference to FIGS. 1-4, the tool-holder unit 10 preferably comprises a spindle 12, preferably actuated by an electric motor 17, so that the spindle 12 is also known in the art with the term of electro-spindle.

The spindle 12 is configured to rotate the circular blade 11 associated thereto.

Preferably, the spindle 12 is also configured to have a free rotation about its own longitudinal rotation axis (rotation W) in the tool change operations as will be better apparent in the following.

Preferably, the spindle 12 is supported by the fork-shaped body 13 of the displacing apparatus 1 integral with the shaft 3.

In particular, the spindle 12 is rotatably supported, by means of rotation pins 15, about a respective rotation axis E-E, substantially perpendicular to the vertical axis Z. In practice, the spindle 12 and the circular blade 11 can be tilted with respect to the fork-shaped body 13.

In this sense, the tool-holder unit 10 can be rotated about the axis E-E (the fork-shaped body 13 on the other hand does not rotate about the same axis E-E).

In the preferred embodiment illustrated herein, the tool-holder unit 10 comprises a motor 14 adapted to move the spindle 12 about the rotation axis E-E to vary the angle of inclination of the spindle 12 with respect to the shaft 3. In this way, the circular blade 11 can be moved according to a further direction of rotation, indicated in the figures by R, to easily carry out, for example, inclined cuts or profile shaping.

Preferably, the fork-shaped body 13 rotates integrally with the shaft 3 about the axis Z (rotation W). The tool-holder unit 10, therefore, preferably comprises at least the elements 11, 12, 14 and 17, but not the supporting body 13 which is part of the displacing apparatus 1.

Preferably, the machining tool 11 is at least partially covered by a protective element or casing 16, as shown in FIGS. 1-4.

In the preferred embodiment illustrated, the machine 100 comprises a handling unit 20 having the function of holding the material 200 suspended above the working plane 102, allowing the same to be repositioned.

Preferably, the handling unit 20 is of pneumatic type and comprises gripping means provided with one or more pneumatically-activated suction cups 21a, tiltable between an initial non-operative position, in which the suction cups 21a cannot interact with the material 200 irrespective of the position of the shaft 3, and a final operative position, in which the suction cups 21a can come in contact with the upper surface of the material 200 when the shaft 3 is lowered along the axis Z onto the same material 200.

Preferably, as shown in FIGS. 1-4, the gripping means of the handling unit 20 comprises a plate 21 with corresponding suction cups 21a, and the plate 21 is integrally fixed to the tool-holder unit 10 and is rotatable along therewith about the axis E-E. With reference to the example of FIG. 4, the plate 21 is fixed by means of screws 21b to the protective element 16 of the circular blade 11. Alternatively, the plate 21 can be omitted and the suction cups of the gripping means of the handling unit 20 are directly formed in the protective element 16.

Figure 2:
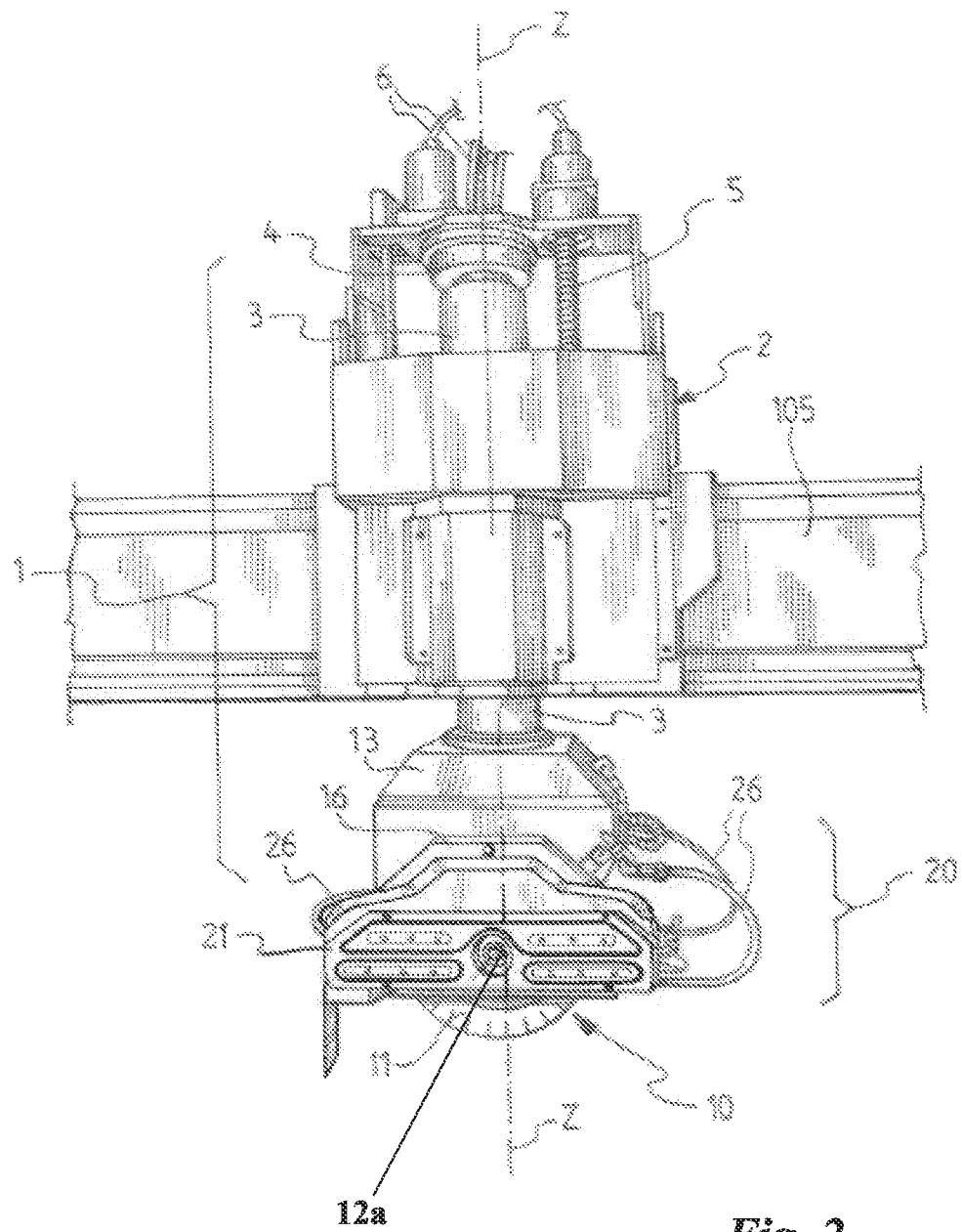
FIG. 2 is a schematic perspective view of a detail of the machine shown in FIG. 1, which illustrates the tool-holder unit and its displacing apparatus, in a first configuration.
Figure 3:
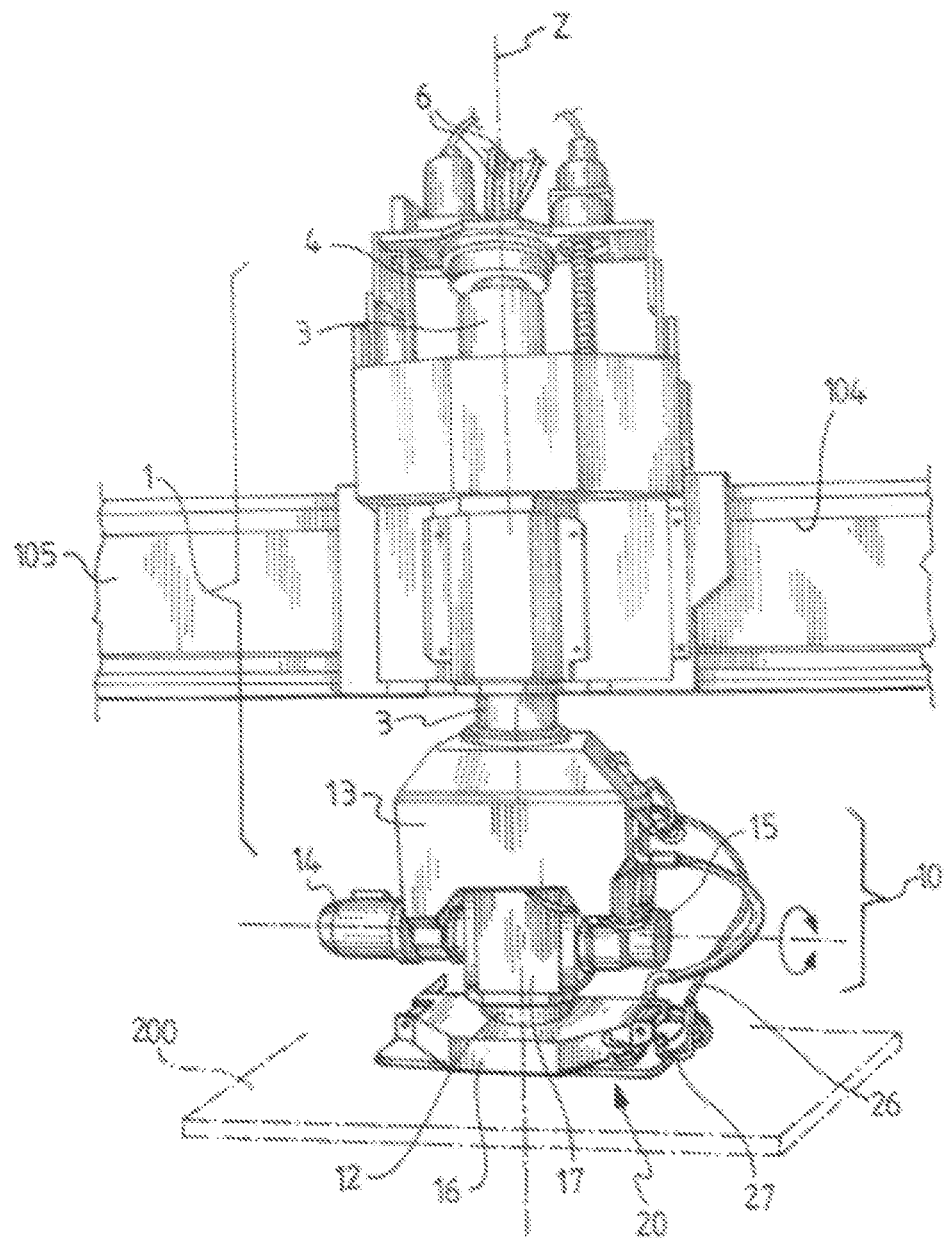
FIG. 3 is a schematic perspective view of a detail of the machine shown in FIG. 1, which illustrates the tool-holder unit and its displacing apparatus, in a second configuration.
Figure 4:
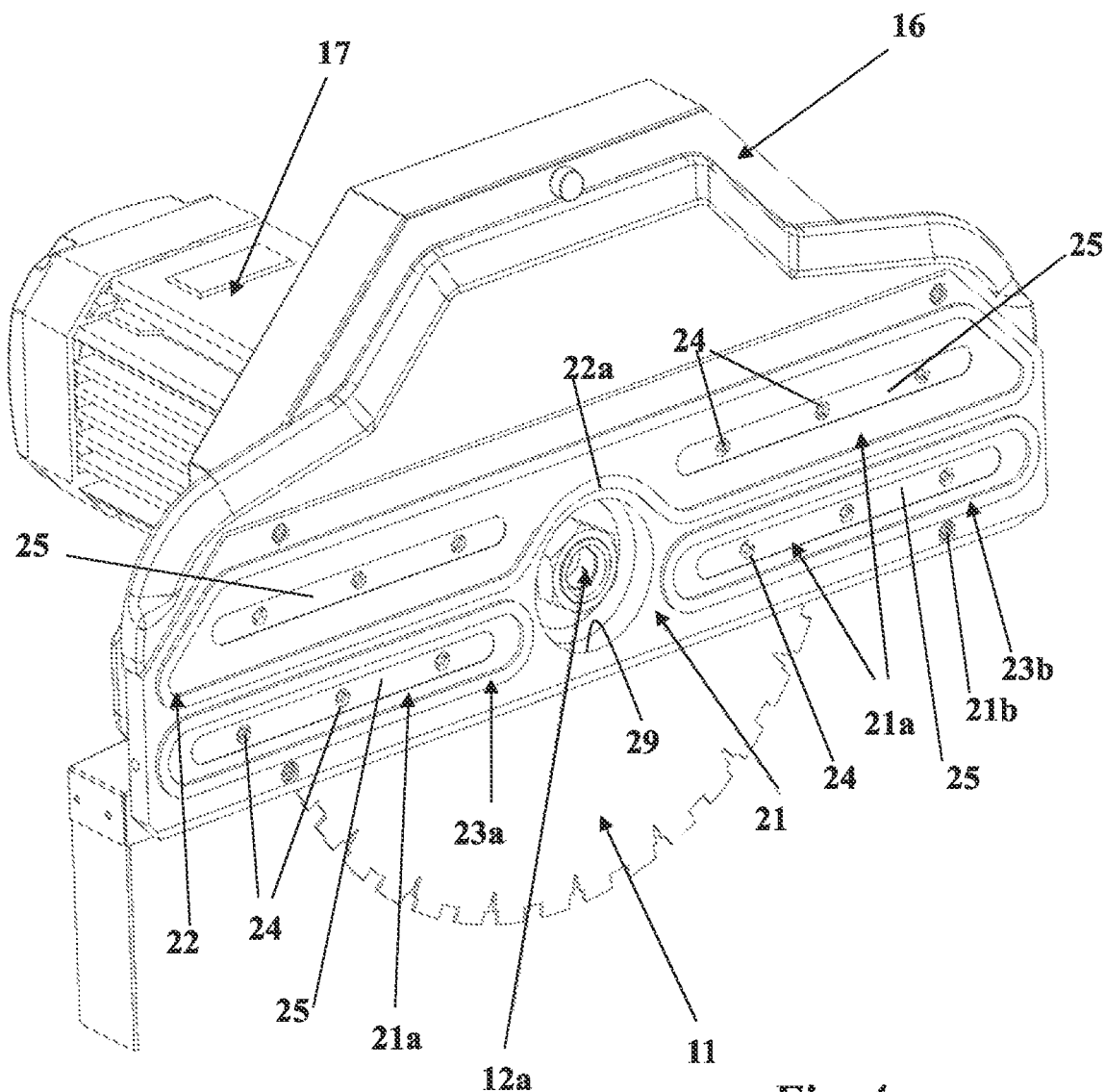
FIG. 4 is a schematic perspective view of a detail of the tool-holder unit shown in FIG. 2.

The first non-operative position of the plate 21 is vertical, as shown in FIGS. 1, 2 and 4 and corresponds to a work position of the circular blade 11 facing the upper surface of the material 200; the second operative position of the plate 21 is horizontal and perpendicular to the shaft 3, as shown in FIG. 3, and corresponds to a non-operative position of the circular blade 11, which remains parallel to the upper surface of the material 200.

The rotation of the tool-holder unit 10 about the axis E-E and therefore of the gripping means of the handling unit 20, may preferably vary between about 0° (i.e. with the plate 21 in a roughly vertical position) and about 90° (i.e. with the plate 21 in a roughly horizontal position).

Preferably, as in the case shown in FIGS. 1-3, the rotating motor 14 is at least partially integrated with at least one of the rotation pins 15. Preferably, the motor 14 is a brushless motor. Moreover, the motor 14 preferably comprises a reduction gear (not shown in the figures).

Preferably, the suction cups 21a are defined by the plate 21 and by one or more gaskets which delimit one or more areas on the surface of the plate 21 (i.e. the surface can lie parallel to the upper surface of the material 200). The areas delimited by the gaskets have a closed perimeter, for example rectangular, circular or of a different shape.

With reference to FIG. 4, the plate 21 of the handling unit 20 preferably comprises three gaskets 22, 23a and 23b housed in suitable grooves formed in the material of the plate 21. The gaskets 22, 23a and 23b delimit corresponding substantially rectangular portions of the surface of the plate 21.

Preferably, the handling unit 20 further comprises one or more air suction ducts 26 connected to the suction cups 21a and in communication with the aforementioned portions. Moreover, surface grooves 25 are preferably formed on the surface of the plate 21, a plurality of openings 24 connected to the air suction ducts 26 being provided in the surface grooves 25.

When the plate 21 is in the operative position, and therefore horizontal, and is brought by the displacing apparatus 1 into abutment against the upper surface of the material 200, the suction of air through the ducts 26 generates a vacuum in the volumes defined by the same material 200, by the gaskets 22, 23a, 23b and by the plate 21. The vacuum degree is preferably adjusted to obtain an effective sucking effect which allows to lift the material 200 along the axis Z together with the tool-holder unit 10.

Preferably, the handling unit 20 also comprises one or more on-off valves 27 of the air flow along the suction ducts 26.

The suction is preferably generated by a pump (not shown)—or by a Venturi system—which is external to or forms part of the handling unit 20, to which the ducts 26 are connected.

The on-off valves 27 are preferably solenoid valves and each of them may be controlled independently from the others to cause the vacuum in just one of the suction cups 21a, for example in the suction cup 21a defined by the gasket 22, or in all of the suction cups 21a.

The solenoid valves are shown outside of the plate 21, but alternatively they can be arranged on the same plate 21 or in a seat associated thereto or on the protective element 16 of the tool-holder unit 10.

Preferably, the machine 100 also comprises a drive and control unit 103 (FIG. 1) equipped with an operator interface. The unit 103 is programmed to operate the displacing apparatus 1, the tool-holder unit 10 and the handling unit 20.

In the preferred embodiment illustrated in FIG. 4 it can be observed that the plate 21 has a through opening 29, free from suction cups 21a (in particular, the gasket 22 comprises a semi-circular shaped portion 22a close to the upper part of the through opening 29). The through opening 29 of the plate 21 allows a free access of the tool-holder unit 10 to a front free end 12a of the spindle 12.

Figure 5:
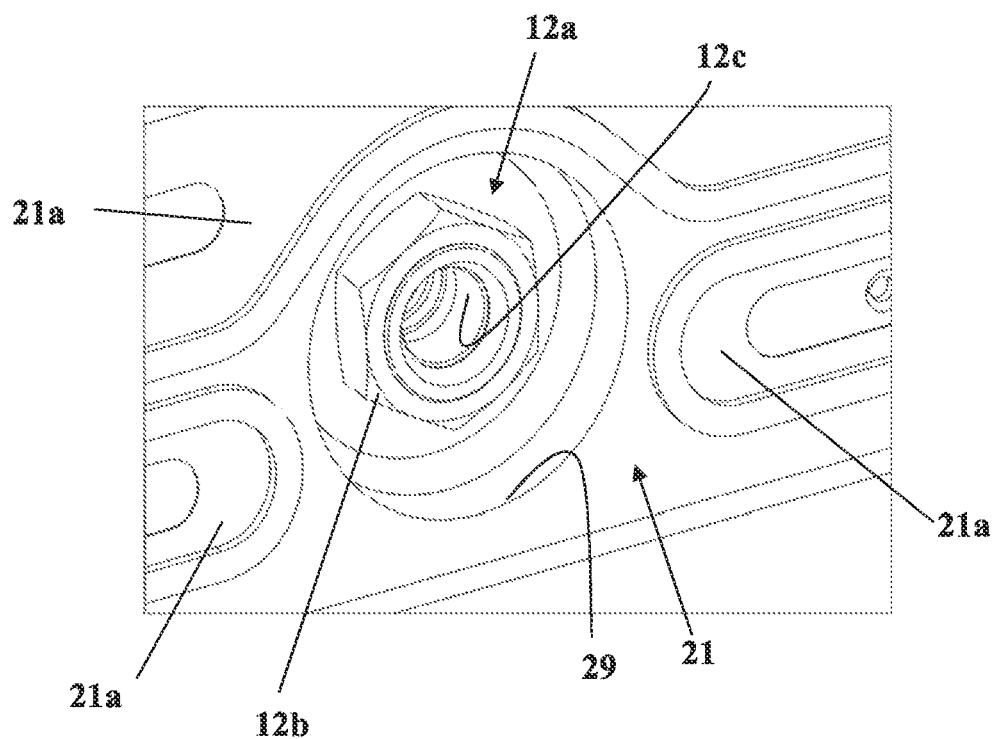
FIG. 5 is a schematic perspective view of a detail of the tool-holder unit shown in FIG. 4, which shows the front free end of the spindle of the tool-holder unit.

FIG. 5 shows an enlarged view of such a front free end 12a, in which a nut 12b is visible, the hole 12c of which is arranged at the end of an axial hole of the spindle 12 which carries a fluid, for example water, intended to cool down the machine tools of the tool-holder unit 10.

For example, the aforementioned fluid comes from the respective supply line 6 described above.

In the preferred embodiment illustrated, a tool-holder coupling element 60 is arranged in this hole 89, to which the tool-holder 50 supporting the second machining tool 28 can be removably coupled, as will be better explained below.

Preferably, both the tool-holder coupling element 60 and the tool-holder 50 are provided with respective axial holes 60c and 50c, which are in fluid communication with the hole 12c and carry the fluid intended to cool down the second machining tool of the tool-holder unit 10.

The tool-holder unit 10 of this preferred embodiment of the invention is therefore advantageously configured for rotation about the vertical axis Z and for the passage and direction of the cooling fluid towards the machining tools provided (in this case, circular blade 11 and second machining tool 28).

Preferably, the tool-holder 50 comprises a substantially cylindrical body 51 from which a coupling flange 54, which will be illustrated more in detail hereafter, is radially extending. An external recess 53 is formed near the coupling flange 54 to house the tool-holder 50 in a tool storage area of the machine 100 comprising a plurality of storage stations of tool-holders 50 (stations partially visible in FIGS. 10-15).

Preferably, the tool-holder coupling element 60 comprises a cylindrical portion 62, which is fixed in this hole 12c, i.e. the hole 12c forms a cylindrical seat for this cylindrical portion 62.

Preferably, the cylindrical portion 62 is threaded and is screwed to a corresponding thread of the axial hole 89 of the spindle 12.

Preferably, the tool-holder coupling element 60 comprises a coupling flange 64 configured to cooperate with the coupling flange 54 of the tool-holder 50. In the preferred embodiment illustrated, the coupling flanges 54, 64 have an annular shape.

Figure 7:
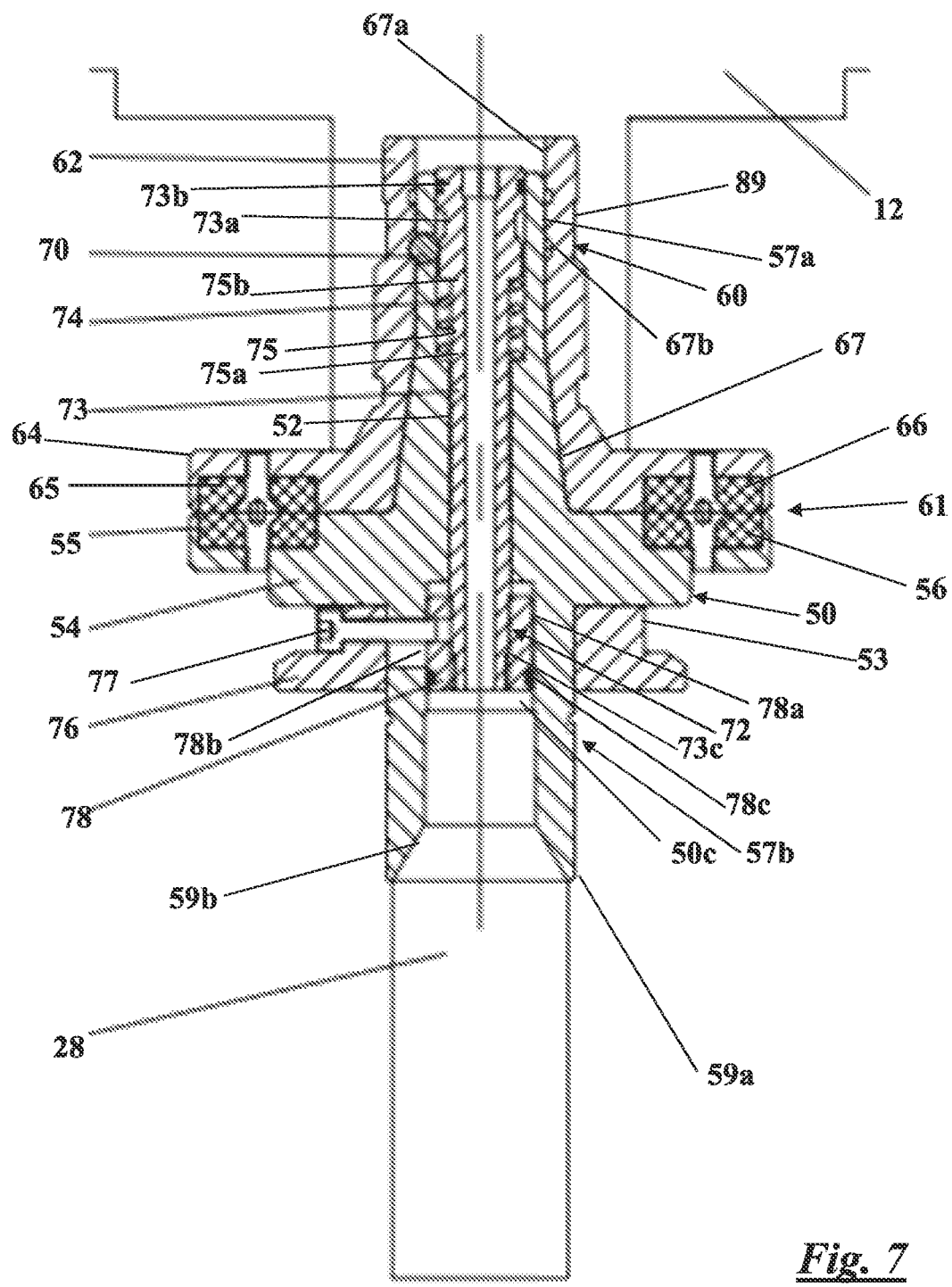
FIG. 7 is a schematic view in longitudinal section of the tool-holder and of the tool-holder coupling element shown in FIG. 6 in a coupling configuration.

According to the invention and as best illustrated in FIGS. 6 and 7, the tool-holder unit 10 of the machine 100 comprises a coupling assembly, generally indicated at 61, for removably coupling the second machining tool 28 to the front free end 12a of the spindle 12.

The coupling assembly 61 comprises:
a) the tool-holder 50 associated to the second machining tool 28;
b) at least one mechanical coupling device 63 provided with elements cooperating in abutment relationship to make the tool-holder 50 and the spindle 12 rotationally integral with each other; and
c) a first axial locking element of the tool-holder 50 configured to removably lock in translation and in a substantially axial direction the tool-holder 50 on the spindle 12.

According to the preferred embodiment illustrated in the figures, this first axial locking element of the coupling assembly 61 between the second machining tool 28 associated to the tool-holder 50 and the tool-holder coupling element 60 comprises a magnetic device for fixing the tool-holder 50 to the spindle 12.

Even more preferably, this magnetic fixing device for fixing the tool-holder 50 to the spindle 12 comprises:
a plurality of first magnets 65 with north polarity and a plurality of first magnets 66 with south polarity, associated to the tool-holder coupling element 60 associated to the front free end 12a of the spindle 12, and
a plurality of corresponding second magnets 55 with south polarity and a plurality of second magnets 56 with north polarity associated to a free end of the tool-holder 50.

Preferably, the first magnets 65 with north polarity and the first magnets 66 with south polarity are associated to, even more preferably embedded in, the coupling flange 64 of the tool-holder coupling element 60.

Preferably, the second magnets 55 with south polarity and the second magnets 56 with north polarity are associated to, even more preferably embedded in, the coupling flange 54 of the tool-holder 50.

Preferably, furthermore, said first and second magnets 65, 66 and 55, 56 are arranged circumferentially alternating with each other in the tool-holder coupling element 60 and, respectively, at the free end of the tool-holder 50.

The coupling between tool-holder coupling element 60 and second tool 28 supported by the respective tool-holder 50 is accomplished when the first magnets 65, 66 are respectively magnetically associated to the second magnets 55, 56.

It is observed that in another preferred embodiment of the invention (not shown), the tool-holder coupling element 60, with the above features and those which will be described below, can be made integral with the spindle 12.

In particular, the front free end 12a of the spindle 12 can comprise the plurality of first magnets 65, 66 possibly positioned in the coupling flange 64 integrally made with the spindle 12.

Preferably, the magnets 55, 56, 65 and 66 are equal in number (in the illustrated example four pairs of magnets 55, 56 and four pairs of magnets 65, 66 are provided).

In an alternative preferred embodiment, just two pairs of magnets 55, 65 and just two pairs of magnets 56, 66 may be provided. More preferably, however, a greater number of such pairs, for example three, four, five or six may be provided, so as to optimise—as outlined above—the coupling operations between the front free end 12a of the spindle 12 and the free end of the tool-holder 50.

Preferably, the magnets 55, 65 are circumferentially arranged alternating with the magnets 56, 66.

Preferably, the magnets 55, 56, 65 and 66 have coupling surfaces provided with a circular shape having the same size.

In the preferred embodiment illustrated, the elements cooperating in abutment relationship of the mechanical coupling device 63, configured to make the tool-holder 50 and the spindle 12 rotatably integral with each other, comprise:
a plurality of driving pegs 58, axially extending from the tool-holder 50, and
a corresponding plurality of respective housing seats 68 of said driving pegs 58, formed in the tool-holder coupling element 60.

In an alternative preferred embodiment, just a single pair of driving pegs 58 can be provided, preferably with a number of respective housing seats 68 greater than two, so that the driving pegs 58 can be coupled to one of such housing seats 68, in a number of different angular positions.

In a further preferred embodiment of the invention (not shown), the driving pegs 58 are formed on the tool-holder coupling element 60, while the housing seats 68 are formed in the tool-holder 50.

In the preferred example shown in FIG. 6, four driving pegs 58 and eight respective housing seats 68 are provided, arranged on the annular coupling flanges 54 and 64, respectively.

In particular, the driving pegs 58 and the housing seats 68 are circumferentially arranged at an equal distance from each other on the annular coupling flanges 54 and 64, respectively.

Preferably, the driving pegs 58 are circumferentially interposed between the magnets 55 and 56, and the respective housing seats 68 are circumferentially interposed between the magnets 65 and 66.

In this way, any alignment between the magnets 55, 56 and 65, 66 involves a corresponding alignment between the driving pegs 58 and the respective housing seats 68.

Preferably, the driving pegs 58 have a shorter axial extension than that of the frusto-conical guide 57.

In the preferred embodiment illustrated in FIG. 6, the driving pegs 58 comprise a cylindrical portion 58a and a substantially conical end portion 58b, while the housing seats 68 have a cylindrical section to house the cylindrical portion 58a of the driving pegs 58.

In FIG. 7 it may be observed that the tool-holder 50 comprises, at a front end 59a thereof, a seat 59b—preferably conical—adapted to house the second machining tool 28.

In a preferred embodiment, the coupling assembly 61 between the second machining tool 28 and the front free end 12a of the spindle 12 also comprises a frusto-conical guide 57 formed on the tool-holder 50, and a corresponding frusto-conical seat 67 formed in the tool-holder coupling element 60.

Preferably, the annular coupling flange 54 of the tool-holder 50 coaxially extends about the frusto-conical guide 57, just as the annular coupling flange 64 of the tool-holder coupling element 60 coaxially extends about the frusto-conical seat 67.

In a preferred embodiment, the tool-holder unit 10 further comprises a plug (not shown) configured to close the frusto-conical seat 67 of the tool-holder coupling element 60 when the tool-holder 50 is disassembled from the tool-holder coupling element 60.

Preferably, the plug is provided with a frusto-conical portion extending from a disc-shaped portion and which may be inserted with a substantial shape mating in the frusto-conical seat 67.

Preferably, the plug is made of a metallic material and is removably coupled to the tool-holder coupling element 60 by means of at least one magnet, arranged in a flat annular surface arranged about the frusto-conical seat 67.

Preferably, a flat annular surface of the coupling flange 64 is recessed with respect to the coupling flange 64, so that the disc-shaped portion of the plug mounted on the tool-holder coupling element 60 preferably lies flush with the coupling flange 64.

According to the invention, the coupling assembly 61 for removably coupling the second machining tool 28 to the front free end 12a of the spindle 12 further comprises:
 a substantially cylindrical shank 57a extending from the free end of the tool-holder 50, and
 a substantially cylindrical housing seat 67a of said shank 57a, axially formed in the spindle 12.

In the preferred embodiment illustrated, the housing seat 67a is axially formed in the tool-holder coupling element 60 associated to the front free end 12a of the spindle 12.

According to the invention, the coupling assembly 61 further comprises at least a second axial locking element of the tool-holder 50, configured to removably lock in translation and in a substantially axial direction the tool-holder 50 in the spindle 12 and translationally movable in radial direction to removably lock the shank 57a in the respective housing seat 67a.

Preferably, the substantially cylindrical shank 57a coaxially extends from the frusto-conical guide 57 and is located axially more external than the frusto-conical guide 57, at the free end of the tool-holder 50 opposite to the second tool 28.

Similarly, the substantially cylindrical housing seat 67a is preferably coaxially extending from the frusto-conical seat 67 and is arranged at an axially more internal position in the spindle 12 than the frusto-conical seat 67, at the free end of the tool-holder coupling element 60 opposite the coupling flange 64.

In the preferred embodiment illustrated, the second axial locking element of the tool-holder 50 comprises a plurality of locking balls 70 mounted in the shank 57a and which are radially movable on command between a retracted position and an extracted position.

The locking balls 70 are preferably at least two.

In the non-limiting example of FIG. 6, the locking balls 70 are three (two of which are visible), offset from each other at an angle at the centre of about 120°.

The locking balls 70 can be made of hardened steel.

The retracted position is a releasing position of the shank 57a, wherein the locking ball 70 does not project from the shank 57a.

The extracted position is a locking position of the shank 57a, wherein the locking balls 70 at least partially project from the shank 57a and are at least partially housed in a corresponding first housing seat 67b formed in the substantially cylindrical housing seat 67a of the shank 57a (FIG. 7).

Preferably, the first housing seat 67b has a semi-toroidal shape.

In the preferred embodiment illustrated, the tool-holder 50 comprises a driving element 72 of the second axial locking element of the tool-holder 50.

Preferably, the driving element 72 is movable along the axial direction of the tool-holder 50 and is configured to be actuated from the outside of the tool-holder 50.

Preferably, the driving element 72 comprises a driving stem 73, which is slidably mounted in the axial direction in the tool-holder 50 between a first position and a second position.

Preferably, the driving stem 73 is hollow, to allow passage of the cooling fluid for the second machining tool 28.

The first position of the driving stem 73 is a locking position of the shank 57a, wherein the driving stem 73 urges the locking balls 70 in the extracted position in which they at least partially project from the shank 57a.

The second position driving stem 73 is a releasing position of the shank 57a, wherein the locking balls 70 are in the retracted position and are at least partially housed in a respective second housing seat 73a formed in the driving stem 73.

Preferably, the second housing seat 73a of the locking ball 70 is formed in a first end portion 73b of the driving stem 73.

In the preferred embodiment illustrated, the driving stem 73 is slidably mounted in a through cavity 52 centrally formed in the tool-holder 50 and preferably extending in the frusto-conical guide 57 and in the substantially cylindrical shank 57a.

In the preferred embodiment illustrated, the driving element 72 further comprises an elastic element 74 which is active along a thrust direction adapted to keep the driving stem 73 in the first locking position of the shank 57a.

In the non-limiting example shown in FIG. 7, the elastic element 74 of the driving element 72 is a helical spring mounted in a respective annular housing seat 75 defined in the shank 57a between an inner wall of the through cavity 52 formed in the tool-holder 50 and an outer wall of the driving stem 73.

Preferably, the helical spring comprises opposite ends which are active on a first annular shoulder 75a extending from the inner wall of the through cavity 52 and, respectively, on a second annular shoulder 75b extending from the outer wall of the driving stem 73.

In the preferred embodiment illustrated, the driving element 72 of the second axial locking element of the tool-holder 50 comprises an actuation head 76 fixed to an end portion of the driving stem 73 externally positioned with respect to the housing seat 67a of the substantially cylindrical shank 57a.

Preferably, the actuation head 76 of the driving element 72 is slidably mounted on a cylindrical portion 57b of the tool-holder 50 opposite to the substantially cylindrical shank 57a.

Preferably, the actuation head 76 is fixed to an end portion 73c of the driving stem 73 externally positioned with respect to the housing seat 67a of the substantially cylindrical shank 57a by means of a fixing element 77.

Preferably, the fixing element 77 is fixed to a bushing 78, integral (for example by screwing) to the end portion 73c of the driving stem 73.

Preferably, the bushing 78 is substantially annular and cylindrical in shape and is slidable within a cylindrical cavity 78a of the cylindrical portion 57b of the tool-holder 50.

Preferably, a ring gasket 78c, housed in a suitable circumferential seat formed on the bushing 78, is interposed between the bushing 78 and the cylindrical cavity 78a.

The fixing element 77 can be for example a screw screwed into the bushing 78, or a peg or a fixing pin, associated to the bushing 78.

Preferably, the fixing element 77 is slidably guided in a through slot 78b formed in the cylindrical portion 57b of the tool-holder 50.

In the preferred embodiment illustrated, the actuation head 76 abuts against the coupling flange 54 of the tool-holder 50 when the driving stem 73 of the driving element 72 is in the first locking position of the shank 57a.

In the preferred embodiment illustrated, the external recess 53 described above formed near the coupling flange 54 and configured to house the tool-holder 50 in the tool storage area is advantageously formed in the actuation head 76 of the driving element 72 in its portion facing the flange 54 of the tool-holder 50.

Preferably and advantageously, said external recess 53 is also configured to be engaged by a manoeuvring tool 80 of the actuation head 76 (FIGS. 10-15). In a preferred embodiment, the manoeuvring tool 80 comprises at least one arm 82, preferably a pair of arms 82 forming a substantially fork-shaped element, each preferably provided with a tapered end portion 84.

Advantageously, the tapered end portion 84 of each arm 82 is configured to engage the external recess 53 of the actuation head 76 of the driving element 72 and to drive in translation the driving stem 73 of the driving element 72 towards the second releasing position of the shank 57a.

To this end, the actuation head 76 is preferably provided with a chamfer in its portion facing the flange 54 of the tool-holder 50 the external surface of which is configured to cooperate by sliding with the external surface of the tapered end portion 84 of each arm 82.

In this preferred embodiment and thanks to this configuration, the sliding cooperation between the actuation head 76 and the tapered end 84 of each arm 82 causes an axial translation of the actuation head 76 and, therefore, of the driving stem 73 associated thereto, to and from the aforesaid locking and releasing positions of the shank 57a in the respective housing seat 67a.

As described above, the machine 100 comprises a tool storage area comprising a plurality of storage stations of tool-holders 50 associated to respective machining tools 28, 128 (two different machining tools 28, 128 are shown in FIGS. 10-16).

Preferably, the storage stations of the tool storage area include a fork-shaped element supporting each tool-holder 50.

Preferably, the aforesaid fork-shaped element supporting each tool-holder 50 is part of the manoeuvring tool 80 described above of the actuation head 76 of the driving element 72 of the second axial locking element of the tool-holder 50, which manoeuvring tool 80 includes the said pair of suitably shaped arms 82.

In this way, the machine 100 according to this preferred embodiment of the invention advantageously allows an automation of the assembling operations of the coupling assembly 61 as will be better apparent in the following.

Figure 8:
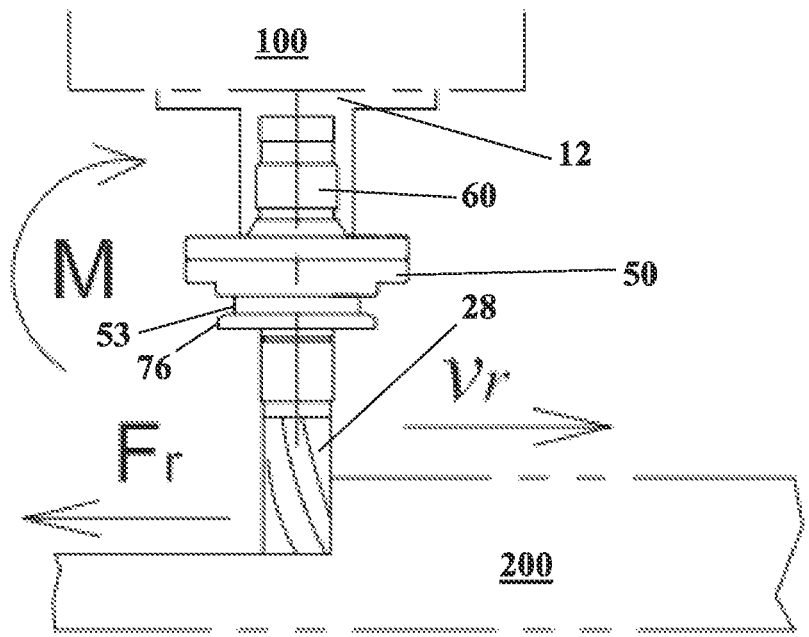
FIG. 8 is a schematic side view of the tool-holder unit of FIG. 6, in a milling operation of a block or slab material.
Figure 9:
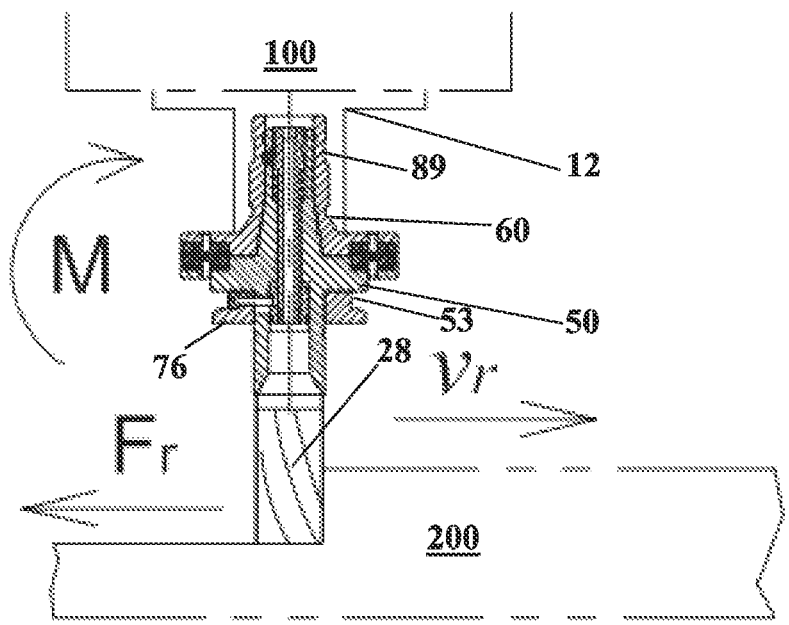
FIG. 9 is a schematic side view in partial section of a tool-holder unit of FIG. 6, in a milling operation of a block or slab material.

FIGS. 8 and 9 schematically illustrate the main machining parameters in case of milling. The tool-holder unit 10 has a transversal advancement speed vr (and moves in the direction of the arrow) and is subject to a transversal resistance force Fr, which is substantially transversal with respect to the rotation axis of the second machining tool 28. The transversal resistance force Fr generates on the coupling between tool-holder 50 and tool-holder coupling element 60 a tilting moment M which tends to move the fixing surfaces of tool-holder 50 and spindle 12 away from each other.

Preferably, the tool-holder unit 10 described above can be made in the configuration wherein the locking balls 70 in the working position have a small clearance with the housing seat 67b and get locked only in the event of possible small axial deviations between the tool-holder 50 and tool-holder coupling element 60 as a result of the aforementioned tilting moment M.

Therefore, the locking balls 70 may not be mechanical locking or centring elements during normal use and actively operate only in critical situations where the force of the magnets 55, 56, 65, 66 is not sufficient to prevent a displacement in the axial direction between the tool-holder 50 and the tool-holder coupling element 60.

Preferably, therefore, the centring elements in the tool-holder unit 10 of the invention may consist of the frusto-conical guide 57 and of the corresponding frusto-conical seat 67.

In a condition of normal use, moreover, the fixing force in the axial direction between the tool-holder 50 and the tool-holder coupling element 60 is given only by the magnets 55, 56, 65, 66.

What has been said is important because it allows not to use elastic elements (for example polymers) for the first housing seat 67b of the locking balls 70. As a matter of fact, it would not be possible to rotate the spindle 12 at high speed in the presence of such a flexible elastic element.

Advantageously, the tool-holder unit 10 according to the present invention does not require any pneumatic or electromechanical driving element during all the operating steps.

Therefore, the tool-holder unit 10 according to the present invention does not require pressure fluids (pneumatic or hydraulic) nor dedicated mechanical actuators for its operation.

Advantageously, the tool-holder unit 10 according to the present invention has reduced external dimensions, comparable to those of the tool-holder unit disclosed in International patent application No. WO 2013/008154. These dimensions are lower than those of electro-spindles equipped with pneumatic-mechanical fixing devices (of the so-called "ISO cone" type) currently on the market.

Advantageously, with the tool-holder unit 10 according to the present invention, during the working steps the risk is avoided of an accidental downward displacement of the actuation head 76 with a corresponding detachment of the tool-holder 50.

With reference to the machine 100 illustrated above, a preferred embodiment of the method for machining block or slab materials according to the invention, which can be carried out by means of the aforesaid machine, will now be described.

In a first step, the method comprises arranging the block or slab material 200 to be worked on the working plane 102 and, subsequently, the step of moving the tool-holder unit 10 above the working plane 102, for example parallel to and perpendicularly thereto, to carry out the machining operations on the block or slab material 200.

Preferably, this moving step is carried out by means of the displacing apparatus 1 of the tool-holder unit 10, described above.

For example, the machining operations performed on the block or slab material 200 may comprise a cutting operation by means of the circular blade 11 which is mounted, as a first machining tool, on the spindle 12 of the tool-holder unit 10.

The method further comprises the step of removably coupling a second machining tool 28, 128 (for example, an end mill, a grinder, a drill bit, etc.) to the front free end 12a of the spindle 12 of the tool-holder unit 10 by means of the coupling assembly 61.

By means of this second machining tool 28, 128 an additional machining operation can be performed on the block or slab material 200 (for example, a milling, grinding, drilling operation, etc., depending upon the second tool used).

The step of removably coupling the second machining tool 28, 128 to a front free end 12a of the spindle 12 of the tool-holder unit 10 is carried out by means of the coupling assembly 61 described above.

As illustrated above, this coupling assembly 61 comprises the tool-holder 50 (associated to the second machining tool 28, 128), the mechanical coupling device 63 (provided with elements cooperating in abutment relationship 58, 68 to make the tool-holder 50 and the spindle 12 rotationally integral with each other), the first axial locking element (magnets 55, 56, 65, 66) of the tool-holder 50, as well as the second axial locking element (locking balls 70) of the tool-holder 50.

As illustrated above, the first and the second axial locking elements are configured to removably lock in translation and in a substantially axial direction the tool-holder 50 in the spindle 12.

The second axial locking element (locking balls 70) is translationally movable in the radial direction to removably lock the shank 57a in the respective housing seat 67a.

In a preferred embodiment, the step of coupling the tool-holder 50 to the front free end 12a of the spindle 12 is carried out in the following way:

by moving the spindle 12 towards the tool-holder 50, by orienting the driving pegs 58 with respect to the respective housing seats 68 through a magnetic interaction between the magnets 55, 56 associated to the free end of the tool-holder 50 and the magnets 65, 66 associated to the front free end 12a of the spindle 12, in this case by means of the tool-holder coupling element 60;

by inserting the substantially cylindrical shank 57a of the tool-holder 50 in the housing seat 67a axially formed in the spindle 12 or, if present, in the tool-holder coupling element 60 associated to the front free end 12a of the spindle 12;

by magnetically associating the front free end 12a of the spindle 12 to the free end of the tool-holder 50 by means of said first axial locking element; and by translating the second axial locking element (locking balls 70) of the tool-holder 50 in radial direction to removably lock the shank 57a of the coupling assembly 61 in the respective housing seat 67a.

Preferably, the magnetic interaction between the second magnets 55, 56 associated to the free end of the tool-holder 50 and the first magnets 65, 66 associated to the front free end 12a of the spindle 12, in this case associated to the tool-holder coupling element 60, induces a rotation of the spindle 12 with respect to the tool-holder 50 adapted to bring in a configuration of substantial alignment both the magnets 65, 66 and 55, 56 of opposite polarity associated to the spindle 12 and the tool-holder 50, and the driving pegs 58 with the respective housing seats 68.

Preferably, the step of translating the second axial locking element (locking balls 70) of the tool-holder 50 comprises moving the driving stem 73 towards the first locking position of the shank 57a wherein the driving stem 73 urges the locking balls 70 in the aforesaid extracted position wherein the locking balls 70 at least partially project from the shank 57a (FIGS. 7, 10, 15, 16).

Preferably, the driving stem 73 is moved towards the first locking position of the shank 57a by the action of the elastic element 74 which tends to push the stem 73 into this position as illustrated in FIG. 7.

At the same time, the locking balls 70 are pushed by the stem 73 into the respective housing seat 67b formed in the cylindrical portion 62 of the tool-holder coupling element 60.

In a preferred embodiment, the method of the invention further comprises the step of decoupling the second machining tool 28, 128 from the front free end 12a of the spindle 12 (in this case from the tool-holder coupling element 60) of the tool-holder unit 10 by inserting the tool-holder 50 coupled to the tool-holder coupling element 60 in the substantially rack-type storage device along a lateral insertion path, and by moving the spindle 12 away from the storage device along a direction substantially orthogonal to the lateral insertion path.

Preferably, the step of decoupling the second machining tool 28, 128 from the front free end 12a of the spindle 12 (in this case from the tool-holder coupling element 60) is carried out as follows:

translating the second axial locking element (locking balls 70) of the tool-holder 50 in radial direction to removably unlock the shank 57a from the respective housing seat 67a;

extracting the shank 57a from the respective housing seat 67a;

detaching the tool-holder 50 from the front free end 12a of the spindle 12 (in this case from the tool-holder coupling element 60) by moving the tool-holder 50 away from the front free end 12*a* of the spindle 12 (in this case from the tool-holder coupling element 60).

In this way, the tool-holder 50 is detached from the spindle 12 (in this case from the tool-holder coupling element 60) overcoming the magnetic attraction force exerted by the magnets 55, 56 and 65, 66.

At the end of this step, the spindle 12, or rather the tool-holder coupling element 60 associated thereto, is again ready to be removably coupled to a different machining tool 28, 128 by means of the coupling assembly 61 according to coupling procedures similar to those illustrated above.

Preferably, the step of translating the second axial locking element (locking balls 70) of the tool-holder 50 in the radial direction comprises translating the locking balls 70 in a radial direction towards the retracted, releasing, position of the shank 57*a*.

Figure 11:
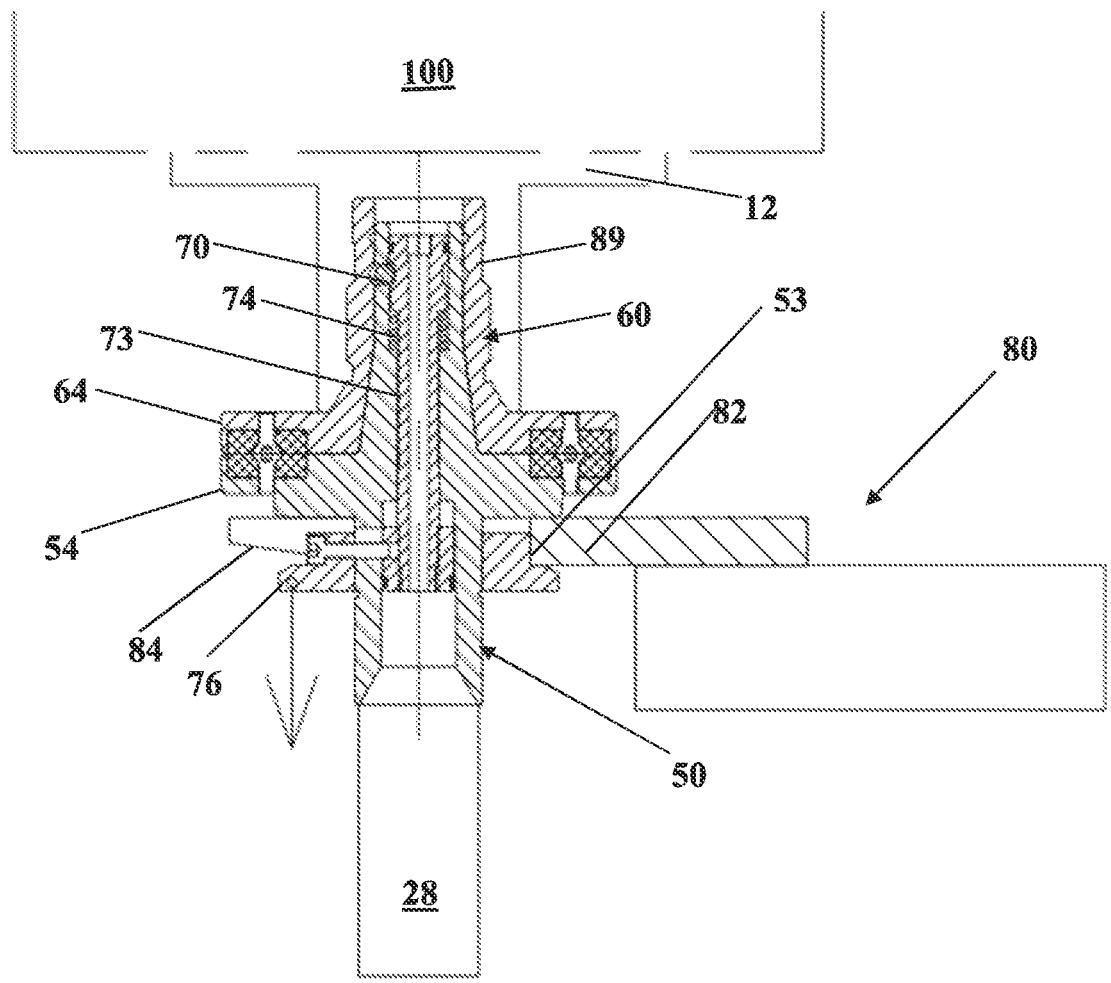
Figure 12:
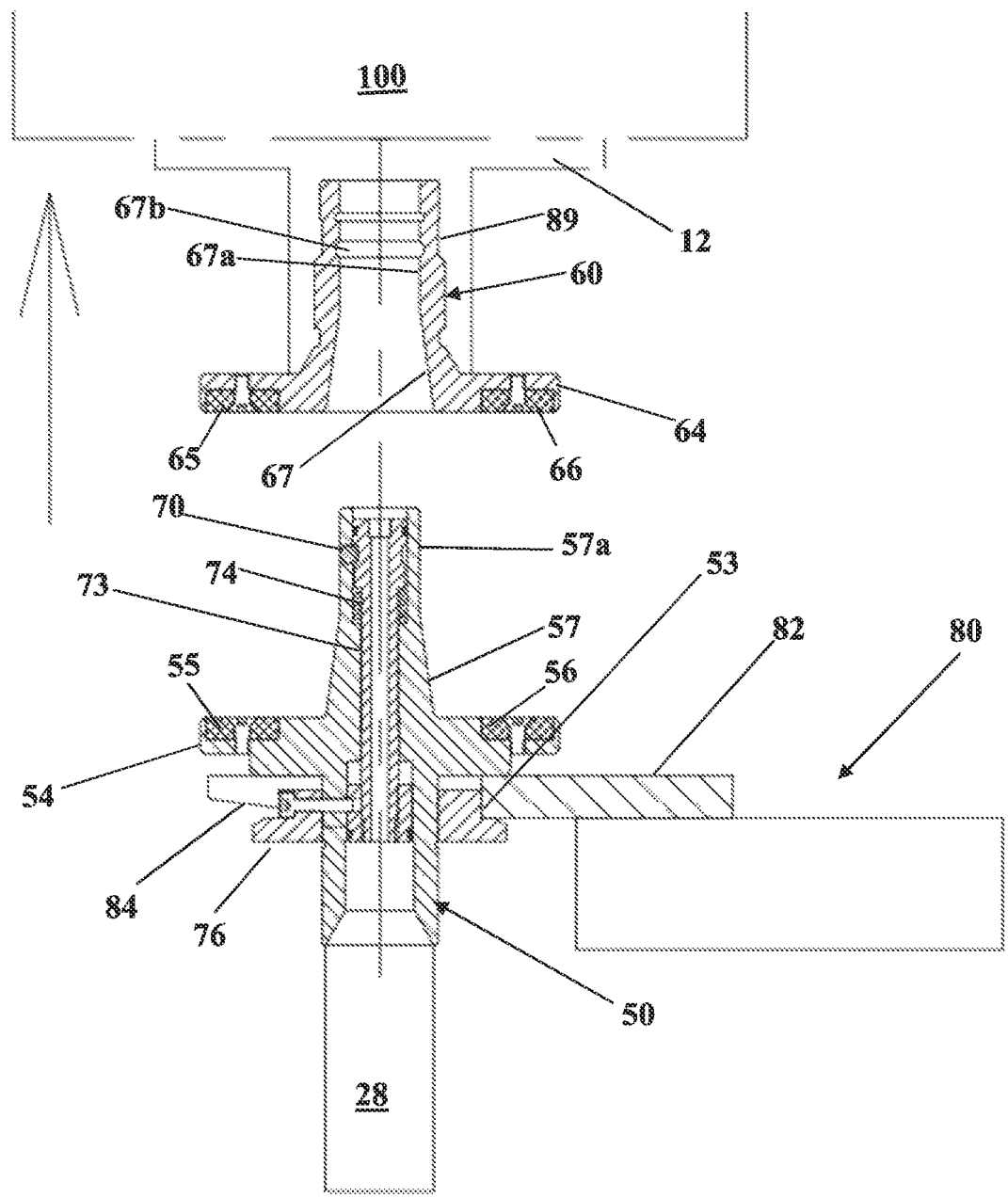

Preferably, this translating step is carried out by moving the driving stem 73 of the driving element 72 towards the second, releasing, position of the shank 57*a*, wherein the locking balls 70 are at least partially housed in the respective second housing seats 73*a* formed in the driving stem 73 (FIGS. 11, 12).

Preferably, the driving stem 73 is moved towards the second releasing position of the shank 57*a* compressing the elastic element 74 along the thrust direction thereof.

Preferably, this action of progressive compression of the elastic element 74 is carried out by gradually engaging, as the manoeuvring tool 80 advances, the tapered end portion 84 of the manoeuvring tool 80 in the external recess 53 of the actuation head 76 of the driving element 72.

Thanks to this engagement, in fact, the actuation head 76 of the driving element 72 is gradually pushed away from the flange 54 of the tool-holder 50 in a direction opposite to the thrust direction of the elastic element 74, which is consequently compressed.

Figure 10:
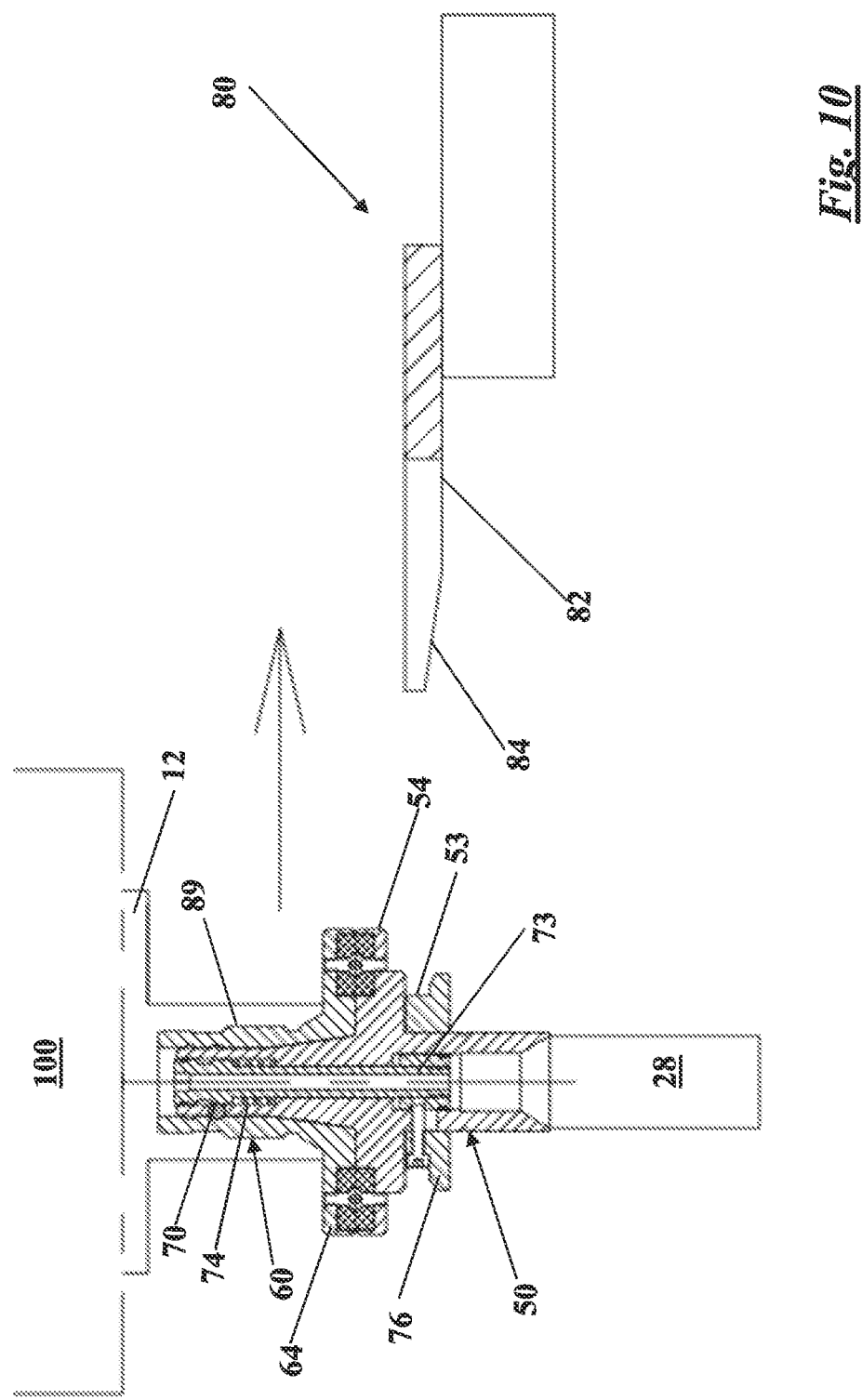
FIGS. 10-16 are schematic sectional views of a tool-holder unit in subsequent steps of a method for machining block or slab materials according to the invention, comprising the release of a first tool-holder (FIGS. 10-12) and the attachment of a second tool-holder (FIGS. 13-16).
Figure 15:
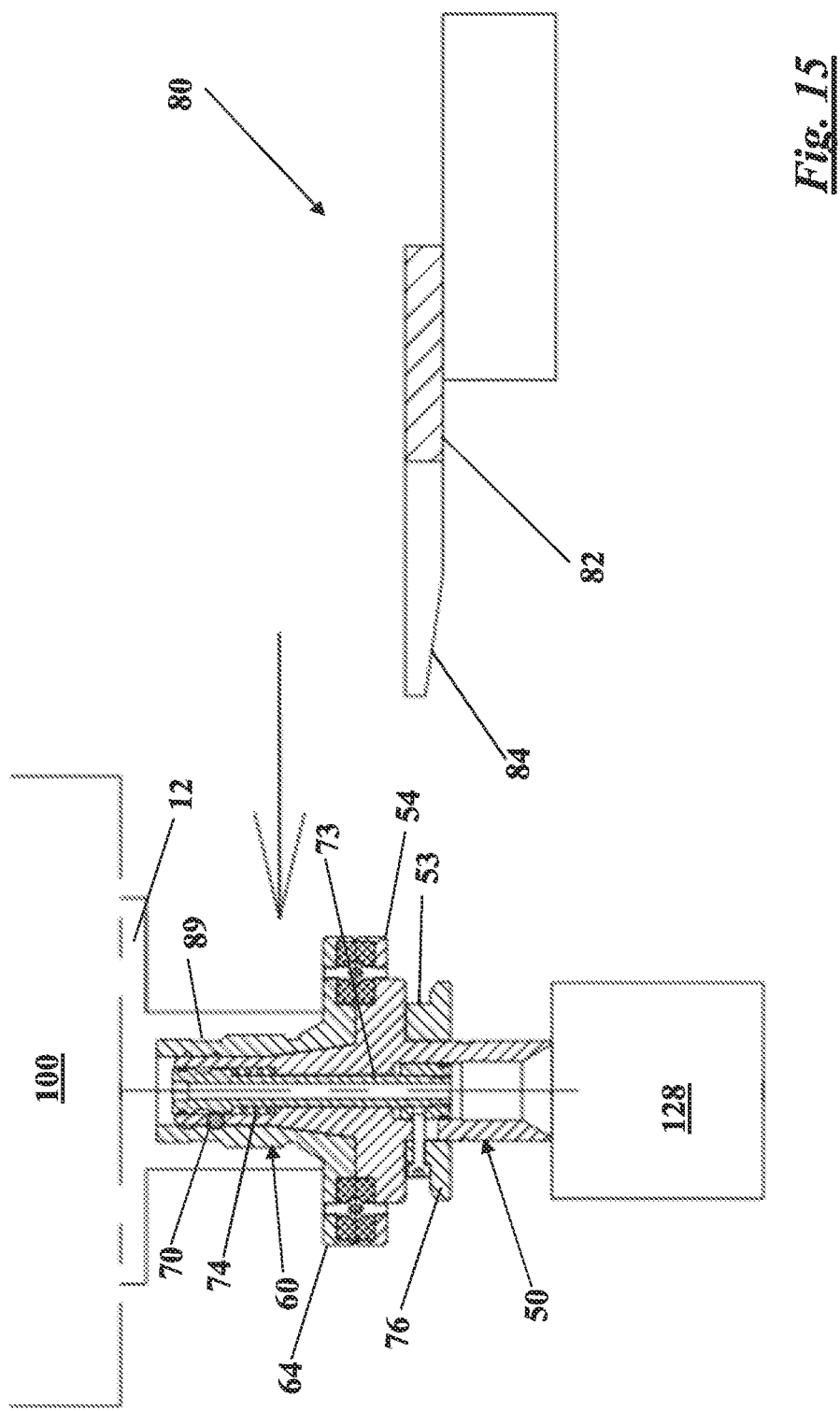

Advantageously, this operation is carried out by laterally inserting the actuation head 76 into the fork-shaped supporting element of the tool-holder 50 provided in the tool storage area so as to trigger the sliding cooperation previously described between the external surface of the chamfer of the actuation head 76 and the external surface of the tapered end portion 84 of each arm 82 of the manoeuvring tool 80, which cooperation is activated by engaging the tapered end 84 in the external recess 53 of the actuation head 76 of the driving element 72 (FIGS. 10, 15).

In a preferred embodiment, the method of the invention comprises the step of storing a plurality of second machining tools 28, 128 and tool-holders 50 associated thereto in the tool storage area described above.

In order to carry out a different machining with a second different machining tool 28, 128, it is necessary to couple a second machining tool 28, 128 to the front free end 12*a* of the spindle 12 of the tool-holder unit 10 according to the above described procedures and to rotate the tool-holder unit 10 itself about the axis E-E, so that the second machining tool is turned towards the material 200.

FIGS. 10-16 show in detail a sequence of steps wherein a second machining tool 28 is decoupled from the tool-holder unit 10 and a second machining tool 128 of different type is coupled.

In FIG. 10 it can be seen that in the working position the locking balls 70 project from the external surface of the shank 57*a*, positioning themselves in the first housing seat 67*b* of the tool-holder coupling element 60. The driving stem 73 prevents the locking balls 70 from retracting towards the rotation axis, locking the shank 57*a* and the housing seat 67*a* in the working position. The helical spring 74 stably keeps the driving stem 73 in this position.

In order to decouple the tool-holder 50 from the tool-holder coupling element 60, the machine 100 brings the actuation head 76 close to the tool storage area and with a horizontal translational movement inserts the actuation head 76 of the tool-holder 50 into the manoeuvring tool 80, at the external recess 53.

As described above, thanks to the cooperation between the tapered end 84 of the manoeuvring tool 80 and the chamfer of the actuation head 76, the engagement of the manoeuvring tool 80 in the external recess 53 of the actuation head 76 induces a downward displacement of the latter as well as of the bushing 78 and of the driving stem 73 associated to the actuation head 76
(FIG. 11).

In this new position, the locking balls 70 are free to move internally, allowing the shank 57*a* to be released from the housing seat 67*a*.

At this point, the machine 100 can translate upwards along its axis Z, moving the spindle 12 away from the tool-holder 50 (FIG. 12).

The attraction force of the magnets 55, 56, 65, 66 is overcome by the action of the linear actuators 5 for vertically positioning the tool-holder unit 10.

Figure 13:
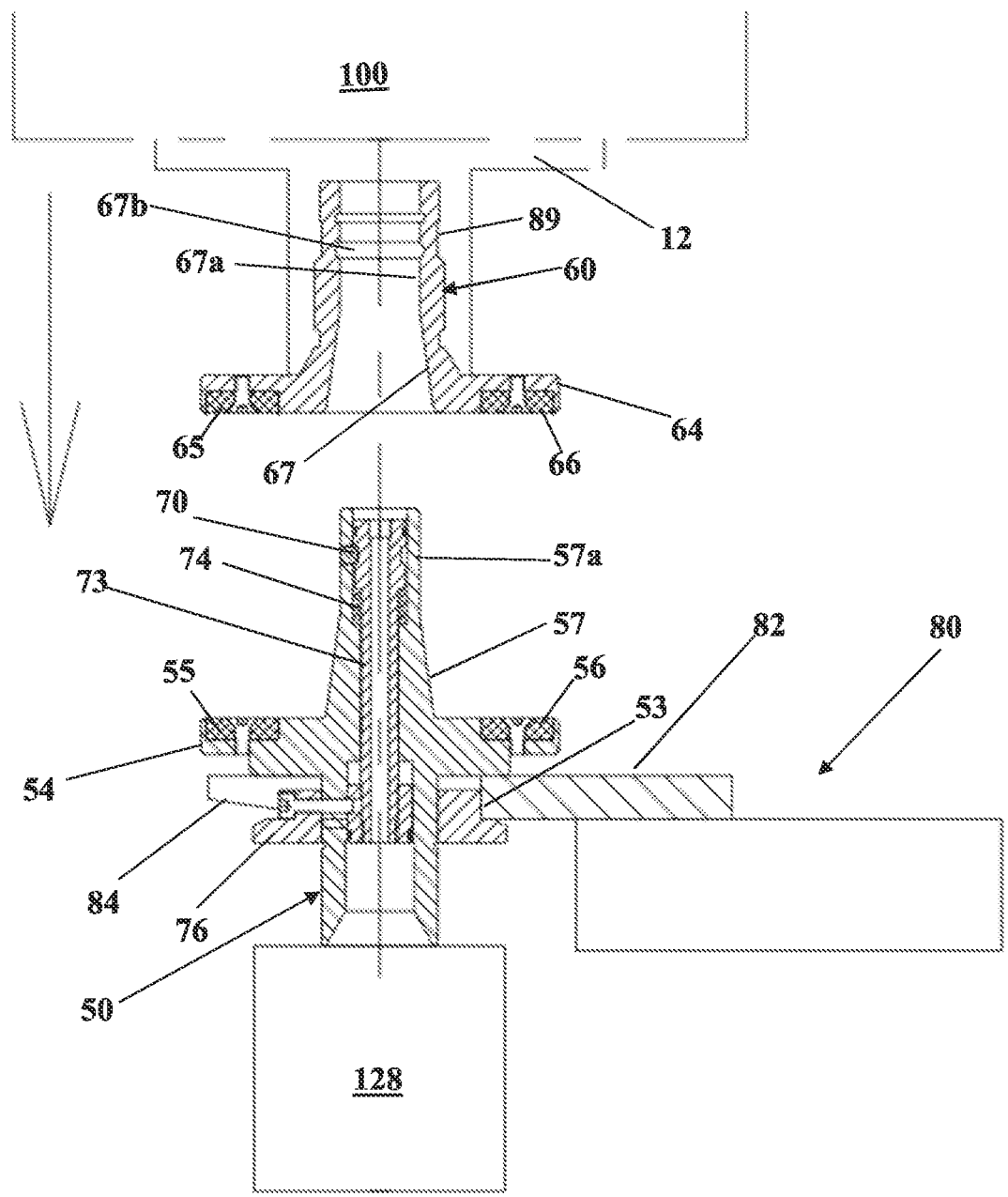

FIG. 13 shows the coupling of a new machining tool 128 associated to a different tool-holder 50.

The spindle 12 by horizontally translating reaches a position of vertical alignment with this different tool-holder 50, positioned in another storage station of the tool storage area.

Figure 14:
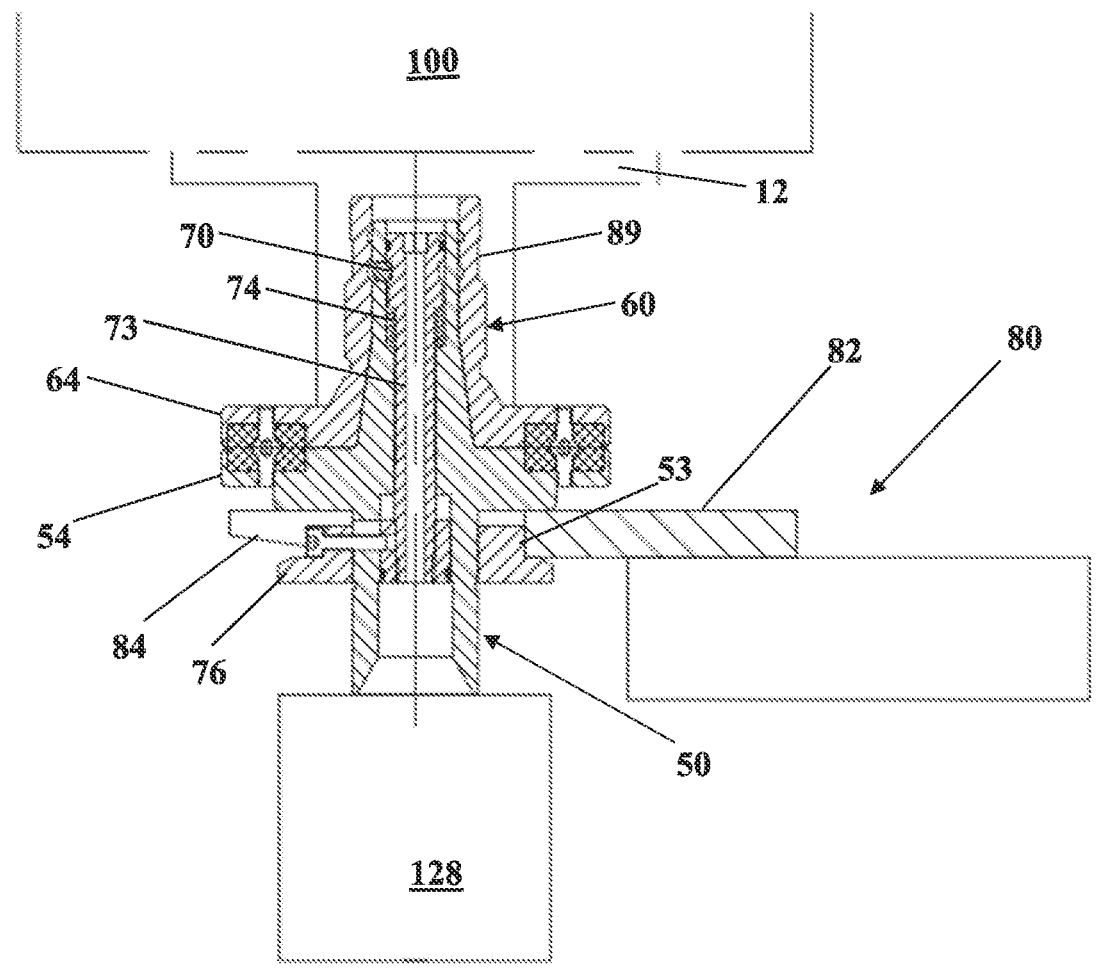

The machine 100 brings the tool-holder coupling element 60 and the new tool-holder 50 into a coupling position moving downwards along the axis Z (FIG. 14).

Preferably and as described above, the step of coupling the new tool-holder 50 to the front free end 12*a* of the spindle 12 is carried out in the following way:

by moving the spindle 12 towards the new tool-holder 50,
by orienting the driving pegs 58 with respect to the respective housing seats 68 through a magnetic interaction between the magnets 55, 56 associated to the free end of the tool-holder 50 and the magnets 65, 66 associated to the front free end 12*a* of the spindle 12, in this case by means of the tool-holder coupling element 60; and
by magnetically associating the front free end 12*a* of the spindle 12 to the free end of the tool-holder 50.

Preferably, the magnetic interaction between the magnets 55, 56 associated to the free end of the tool-holder 50 and the magnets 65, 66 associated to the front free end 12*a* of the spindle 12, in this case associated to the tool-holder coupling element 60, induces a rotation of the spindle 12 with respect to the tool-holder 50 adapted to bring in conditions of substantial alignment both the magnets 65, 66 and 55, 56 having opposite polarity associated to the spindle 12 and to the tool-holder 50, and the driving pegs 58 with the respective housing seats 68.

Once this magnetic coupling between the tool-holder coupling element 60 and the new tool-holder 50 has been completed, the spindle 12 is moved away from the manoeuvring tool 80 by means of a horizontal translation operated by the displacing apparatus 1 of the tool-holder unit 10, described above.

During this horizontal translation, the actuation head 76, the bushing 78 and the driving stem 73 of the driving element 72 gradually reposition themselves in the locking position of the shank 57*a* thanks to the force of the helical spring 74 (FIG. 15). The locking balls 70 are thus gradually pushed back outwards, positioning themselves in the first housing seat 67b of the tool-holder coupling element 60, axially locking the shank 57a of the new tool-holder 50 in the housing seat 67a.

Figure 16:
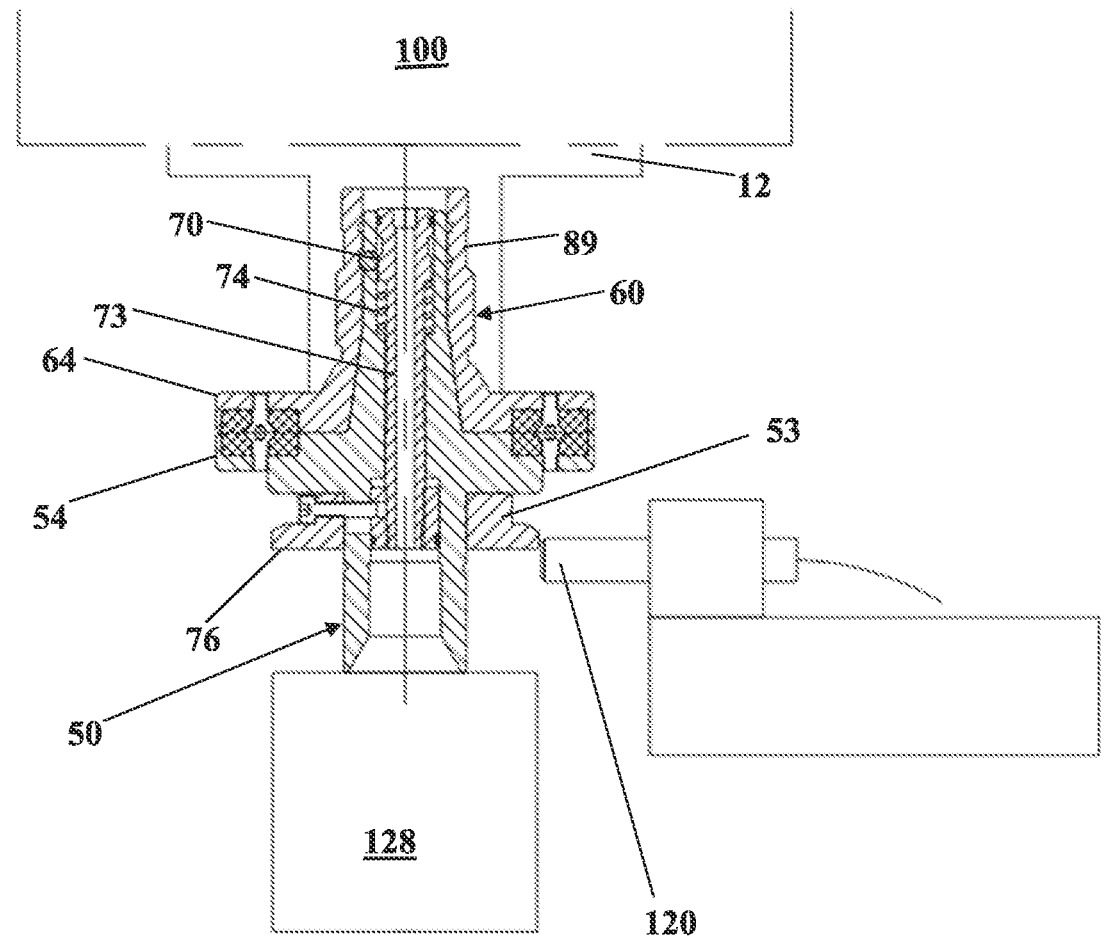

In a preferred embodiment, in order to verify that all these operations have been correctly effected (carried out completely automatically) the machine 100 will position the tool-holder unit 10 near a sensor 120 which reads the position of the actuation head 76, confirming that the tool-holder unit 10 is correctly in the working position (FIG. 16).

In a preferred embodiment, the method of the invention further comprises the step of modifying the position of the block or slab material 200 on the working plane 102, that is, the step of repositioning the block or slab material 200. This step is carried out by means of the handling unit 20, and it is necessary first of all that the tool-holder 50 is uncoupled from the front free end 12a of the spindle 12 according to the procedures illustrated above, i.e. that the front free end 12a of the spindle 12 is not coupled to any tool-holder 50. When it becomes necessary to reposition the block or slab material 200, the control unit 103 activates the handling unit 20, which is initially in the configuration shown in FIGS. 1-2. The circular blade 11, raised with respect to the block or slab material 200, faces the latter and the plate 21 is vertical and cannot come in contact with the material 200. The circular blade 11 occupies a certain position along the axis Z with respect to the fork-shaped body 13 of the displacing apparatus 1.

Preferably, the handling unit 20 is activated by rotating the gripping means, or the plate 21 and the corresponding suction cups 21a, in the operative position, horizontal and proximal with respect to the material 200, shown in FIG. 3. Preferably, once rotated, the plate 21 occupies the position previously taken by the circular blade 11 along the axis Z with respect to the fork-shaped body 13 of the displacing apparatus 1.

Preferably, the control unit 103 controls the displacing apparatus 1 to bring the plate 21 into abutment against the material 200, at least partially compressing the gaskets 22, 23a, 23b.

Preferably, the same unit 103 controls the opening of the valves 27 to achieve an air suction and create the vacuum necessary to obtain an effective suction effect with respect to the weight of the material 200. In this configuration, the material 200 firmly adheres to the plate 21 due to the effect of the vacuum and is displaced by the displacing apparatus 1 into the new position foreseen based on the coordinates X, Y and Z and based on the rotation about the axis Z programmed in the control unit 103.

When the repositioning of the material 200 has been completed, the control unit controls the closing of the valves 27. Consequently, a recovery of pressure in the suction cups 21a of the plate 21 and a release of the material 200 are achieved; the plate 21 is now disengaged from the material 200 and the handling unit 20 may be moved away from the same and deactivated.

Preferably, the deactivation of the handling unit 20 comprises a rotation about the axis E-E to bring the plate 21 back into the initial position described above and at the same time to bring the circular blade 11 in a position ready for use.

Advantageously, the repositioning of the material 200 is obtained without affecting the data processing of the control unit 103, by simply exploiting the same reference system X, Y, Z and the corresponding algorithms.

Clearly, a person skilled in the art, in order to satisfy specific and contingent requirements, may make numerous modifications and variations to the tool-holder unit of a machine for machining block or slab materials, as well as to the machine and to the method for machining block or slab materials described above, all however encompassed by the scope of protection of the present invention as defined by the following claims.

The invention claimed is:

1. A tool-holder unit of a machine for machining block or slab materials, said tool-holder unit being moveable above a working plane of said machine on which the block or slab material to be machined is laid, wherein the tool-holder unit comprises:
    a spindle on which a circular blade can be mounted, and
    a coupling assembly for removably coupling a second machining tool to a front free end of the spindle, comprising:
        a) a tool-holder associated to the second machining tool;
        b) at least one mechanical coupling device provided with elements cooperating in abutment relationship to make the tool-holder and the spindle rotationally integral with each other; and
        c) a first axial locking element of the tool-holder configured to removably lock in translation and in a substantially axial direction said tool-holder on the spindle, said first axial locking element comprising a magnetic fixing device of the tool-holder to the spindle;
        d) a substantially cylindrical shank extending from a free end of the tool-holder;
        e) a substantially cylindrical housing seat of said shank, axially positioned in said spindle or in a tool-holder coupling element associated to the front free end of the spindle; and
        f) at least a second axial locking element of the tool-holder, configured to removably lock in translation and in a substantially axial direction said tool-holder in the spindle, said at least a second axial locking element being translationally movable in radial direction to removably lock said shank in the respective housing seat.

2. The tool-holder unit according to claim 1, wherein said at least a second axial locking element of the tool-holder comprises at least one locking ball mounted in said shank, the at least one locking ball being radially movable on command between:
    a retracted, releasing position of the shank, wherein said at least one locking ball does not project from the shank, and
    an extracted, locking position of the shank, wherein said at least one locking ball at least partially projects from the shank and is at least partially housed in a corresponding first housing seat formed in said substantially cylindrical housing seat of the shank.

3. The tool-holder unit according to claim 1, wherein said tool-holder comprises a driving element of said at least a second axial locking element of the tool-holder movable along the axial direction of the tool-holder and configured to be actuated from the outside of the tool-holder.

4. The tool-holder unit according to claim 3, wherein said at least a second axial locking element of the tool-holder comprises at least one locking ball mounted in said shank, the at least one locking ball being radially movable on command between:
    a retracted, releasing position of the shank, wherein said at least one locking ball does not project from the shank, and an extracted, locking position of the shank, wherein said at least one locking ball at least partially projects from the shank and is at least partially housed in a corresponding first housing seat formed in said substantially cylindrical housing seat of the shank, and wherein said driving element comprises a driving stem, slidably mounted in axial direction in said tool-holder between:

a first, locking position of the shank, wherein the driving stem urges said at least one locking ball in said extracted position in which the locking ball at least partially projects from the shank; and a second, releasing position of the shank, wherein said at least one locking ball is in said retracted position and is at least partially housed in a respective second housing seat (73a) formed in said driving stem.

5. The tool-holder unit according to claim 4, wherein said second housing seat of the locking ball formed in the driving stem is formed in a first end portion of the driving stem.

6. The tool-holder unit according to claim 4, wherein said driving stem is slidably mounted in a through cavity centrally formed in said tool-holder.

7. The tool-holder unit according to claim 4 wherein said driving element comprises an elastic element which is active along a thrust direction adapted to keep said driving stem in said first locking position of the shank.

8. The tool-holder unit according to claim 7, wherein said elastic element of the driving element is a helical spring mounted in a respective annular housing seat defined in said shank between an inner wall of said through cavity formed in the tool-holder and an outer wall of said driving stem.

9. The tool-holder unit according to claim 8, wherein said helical spring comprises opposite ends which are active on a first annular shoulder extending from the inner wall of said through cavity and, respectively, on a second annular shoulder extending from the outer wall of said driving stem.

10. The tool-holder unit according to claim 4, wherein the driving element of said at least a second axial locking element of the tool-holder comprises an actuation head fixed to an end portion of the driving stem externally positioned with respect to the housing seat of said substantially cylindrical shank.

11. The tool-holder unit according to claim 10, wherein the actuation head of the driving element is slidably mounted on a cylindrical portion of said tool-holder opposite to said substantially cylindrical shank.

12. The tool-holder unit according to claim 10, wherein the actuation head of the driving element comprises an external recess configured to be engaged by a maneuvering tool of the actuation head.

13. The tool-holder unit according to claim 1, wherein said tool-holder comprises a coupling flange at the front free end of the spindle or at said tool-holder coupling element associated to the front free end of the spindle.

14. The tool-holder unit according to claim 1, wherein said coupling assembly further comprises a frusto-conical guide, coaxially extending from said tool-holder, and a corresponding frusto-conical seat, formed in said front free end of the spindle orf present, in said tool-holder coupling element associated to the front free end of the spindle.

15. The tool-holder unit according to claim 14, wherein said substantially cylindrical shank coaxially extends from said frusto-conical guide.

16. The tool-holder unit according to claim 1, wherein said magnetic fixing device of the tool holder to the spindle comprises:

at least two first magnets with north polarity and at least two first magnets with south polarity, associated to the front free end of the spindle or to said tool-holder coupling element associated to the front free end of the spindle, and circumferentially arranged alternating with each other at said front free end or at said tool-holder coupling element, and at least two second magnets with south polarity and at least two second magnets with north polarity, associated to a free end of said tool-holder and circumferentially arranged alternating with each other at said free end of the tool-holder.

17. A machine for machining block or slab materials, comprising a working plane on which the block or slab material to be machined is laid and a tool-holder unit moveable above said working plane, wherein the tool-holder unit comprises:

a spindle on which a circular blade can be mounted, and a coupling assembly for removably coupling a second machining tool to a front free end of the spindle, comprising:

a) a tool-holder associated to the second machining tool;

b) at least one mechanical coupling device provided with elements cooperating in abutment relationship to make the tool-holder and the spindle rotationally integral with each other; and c) a first axial locking element of the tool-holder configured to removably lock in translation and in a substantially axial direction said tool-holder on the spindle, said first axial locking element comprising a magnetic fixing device of the tool-holder to the spindle;

d) a substantially cylindrical shank extending from said free end of the tool-holder;

e) a substantially cylindrical housing seat of said shank, axially positioned in said spindle or in a tool-holder coupling element associated to the front free end of the spindle; and f) at least a second axial locking element of the tool-holder, configured to removably lock in translation and in a substantially axial direction said tool-holder in the spindle, said at least a second axial locking element being translationally movable in radial direction to removably lock said shank in the respective housing seat.

18. The machine according to claim 17, wherein said at least a second axial locking element of the tool-holder comprises at least one locking ball mounted in said shank, the at least one locking ball being radially movable on command between:

a retracted, releasing position of the shank, wherein said at least one locking ball does not project from the shank, and an extracted, locking position of the shank, wherein said at least one locking ball at least partially projects from the shank and is at least partially housed in a corresponding first housing seat formed in said substantially cylindrical housing seat of the shank.

19. The machine according to claim 17, wherein said tool-holder comprises a driving element of said at least a second axial locking element of the tool-holder movable along the axial direction of the tool-holder and configured to be actuated from the outside of the tool-holder.

20. The machine according to claim 19, wherein said at least a second axial locking element of the tool-holder comprises at least one locking ball mounted in said shank, the at least one locking ball being radially movable on command between:

a retracted, releasing position of the shank, wherein said at least one locking ball does not project from the shank, and an extracted, locking position of the shank, wherein said at least one locking ball at least partially projects from the shank and is at least partially housed in a corresponding first housing seat formed in said substantially cylindrical housing seat of the shank, and wherein said driving element comprises a driving stem, slidably mounted in axial direction in said tool-holder between:

a first, locking position of the shank, wherein the driving stem urges said at least one locking ball in said extracted position in which the locking ball at least partially projects from the shank; and a second, releasing position of the shank, wherein said at least one locking ball is in said retracted position and is at least partially housed in a respective second housing seat (73a) formed in said driving stem.

21. The machine according to claim 20, wherein the driving element of said at least a second axial locking element of the tool-holder comprises an actuation head fixed to an end portion of the driving stem externally positioned with respect to the housing seat of said substantially cylindrical shank.

22. The machine according to claim 21, wherein the actuation head of the driving element comprises an external recess configured to be engaged by a maneuvering tool of the actuation head.

23. The machine according to claim 22, wherein said machine further comprises a tool storage area comprising a plurality of tool-holders storage stations associated to respective machining tools and wherein said storage stations include a fork-shaped element for supporting the tool-holder provided with a maneuvering tool of the actuation head of the driving element of said at least a second axial locking element of the tool-holder.

24. The machine according to claim 23, wherein said maneuvering tool of the fork-shaped element comprises at least one arm of said fork-shaped element provided with a tapered end portion configured to engage an external recess of the actuation head of the driving element and to drive in translation the driving stem of the driving element of said at least a second axial locking element of the tool-holder towards said second releasing position of the shank.

25. A method for machining block or slab materials comprising:
   A) arranging a block or slab material on a working plane,
   B) moving a tool-holder unit, comprising a spindle on which a circular blade is mounted, above the working plane,
   C) carrying out a cutting operation on said block or slab material by means of said circular blade,
   D) rotating the tool-holder unit about an axis substantially parallel to the working plane,
   E) removably coupling a second machining tool to a front free end of the spindle of the tool-holder unit by means of a coupling assembly comprising:
      a) a tool-holder associated to the second machining tool;
      b) at least one mechanical coupling device provided with elements cooperating in abutment relationship to make the tool-holder and the spindle rotationally integral with each other; and
      c) a first axial locking element of the tool-holder configured to removably lock in translation and in a substantially axial direction said tool-holder on the spindle, said first locking element comprising a magnetic fixing device of the tool-holder to the spindle;
      d) a substantially cylindrical shank extending from said free end of the tool-holder;
      e) a substantially cylindrical housing seat of said shank, axially positioned in said spindle or in a tool-holder coupling element associated to the front free end of the spindle; and
      f) at least a second axial locking element of the tool-holder, configured to removably lock in translation and in a substantially axial direction said tool-holder in the spindle, said at least a second axial locking element being translationally movable in radial direction to removably lock said shank in the respective housing seat;
   wherein E) removably coupling the second machining tool to the front free end of the spindle of the tool-holder unit by means of the coupling assembly comprises:
      E1) moving the spindle towards the tool-holder,
      E2) orienting in alignment with each other the elements cooperating in abutment relationship of the mechanical coupling device of the coupling assembly,
      E3) inserting said substantially cylindrical shank of the tool-holder in said housing seat axially formed in the spindle or in the tool-holder coupling element associated to the front free end of the spindle;
      E4) magnetically associating the spindle or the tool-holder coupling element associated to the free front end of the spindle, with the tool-holder by means of said first axial locking element; and
      E5) translating said at least a second axial locking element of the tool-holder in radial direction to removably lock the shank of the coupling assembly in the respective housing seat;
   F) carrying out an additional machining on said block or slab material by means of said second machining tool.

26. The method according to claim 25, wherein said at least a second axial locking element of the tool-holder comprises at least one locking ball mounted in said shank, the at least one locking ball being radially movable on command between:
   a retracted, releasing position of the shank, wherein said at least one locking ball does not project from the shank, and
   an extracted, locking position of the shank, wherein said at least one locking ball at least partially projects from the shank and is at least partially housed in a corresponding first housing seat formed in said substantially cylindrical housing seat of the shank,
wherein said tool-holder unit comprises a driving element of said at least one locking ball comprising a driving stem, slidably mounted in axial direction in said tool-holder between:
   a first, locking position of the shank, wherein the driving stem urges said at least one locking ball in said extracted position in which the locking ball at least partially projects from the shank; and
   a second, releasing position of the shank, wherein said at least one locking ball is in said retracted position and is at least partially housed in a respective second housing seat formed in said driving stem; and
wherein E5) translating said at least a second axial locking element of the tool-holder comprises moving said driving stem towards said first locking position of the shank wherein the driving stem urges said at least one locking ball in said extracted position wherein said at least one locking ball at least partially projects from the shank.

27. The method according to claim 26, wherein the driving stem is moved towards said first locking position of the shank by a driving element comprising an elastic element active along a thrust direction adapted to keep the driving stem in said first locking position of the shank.

28. The method according to claim 22, wherein said magnetic fixing device of the tool holder to the spindle comprises:
   at least two first magnets with north polarity and at least two first magnets with south polarity, associated to the front free end of the spindle or to said tool-holder coupling element associated to the front free end of the spindle, and circumferentially arranged alternating with each other at said front free end or at said tool-holder coupling element, and
   at least two second magnets with south polarity and at least two second magnets with north polarity, associated to a free end of said tool-holder and circumferentially arranged alternating with each other at said free end of the tool-holder; and
wherein E4) magnetically associating the spindle or the tool-holder coupling element associated to the free front end of the spindle, to the tool-holder, comprises a magnetic interaction between the second magnets associated to the free end of the tool-holder and the first magnets associated to the front free end of the spindle or to said tool-holder coupling element associated to the front free end of the spindle, said magnetic interaction being such as to orient in alignment with each other the elements cooperating in abutment relationship of the mechanical coupling device of the coupling assembly.

29. The method according to claim 25, further comprising G) decoupling the second machining tool from the front free end of the spindle of the tool-holder unit or from the tool-holder coupling element associated to the front free end of the spindle, wherein G) decoupling the second machining tool from the front free end of the spindle of the tool-holder unit or from the tool-holder coupling element associated to the front free end of the spindle comprises:
   G1) translating said at least a second axial locking element of the tool-holder in radial direction to removably unlock said shank from the respective housing seat;
   G2) extracting said shank from the respective housing seat; and
   G3) detaching the tool-holder from the front free end of the spindle or from said tool-holder coupling element associated to the front free end of the spindle by moving the tool-holder away from said front free end or from said tool-holder coupling element associated to the front free end of the spindle.

30. The method according to claim 29, wherein said at least a second axial locking element of the tool-holder comprises at least one locking ball mounted in said shank, the at least one locking ball being radially movable on command between:
   a retracted, releasing position of the shank, wherein said at least one locking ball does not project from the shank, and
   an extracted, locking position of the shank, wherein said at least one locking ball at least partially projects from the shank and is at least partially housed in a corresponding first housing seat formed in said substantially cylindrical housing seat of the shank, and wherein G1) comprises translating said at least one axial locking ball of the tool-holder in radial direction towards said retracted releasing position of the shank, wherein said at least one locking ball does not project from the shank.

31. The method according to claim 30, wherein said tool-holder unit comprises a driving element of said at least one locking ball comprising a driving stem, slidably mounted in axial direction in said tool-holder between:
   said extracted, locking position of the shank, wherein the driving stem urges said at least one locking ball in said extracted position in which the locking ball at least partially projects from the shank; and
   said retracted, releasing position of the shank, wherein said at least one locking ball is in said retracted position and is at least partially housed in a respective second housing seat formed in said driving stem; and
wherein G1) translating said at least a second axial locking element of the tool-holder in radial direction to removably unlock said shank from the respective housing seat is carried out by moving the driving stem of the driving element towards said retracted, releasing position of the shank, wherein said at least one locking ball is at least partially housed in said respective second housing seat formed in the driving stem.

32. The method according to claim 25, further comprising storing a plurality of second machining tools and tool-holders associated thereto in a tool storage area comprising a plurality of storage stations of tool-holders associated to respective machining tools.

33. The method according to claim 32, wherein said at least a second axial locking element of the tool-holder comprises at least one locking ball mounted in said shank, the at least one locking ball being radially movable on command between:
   a retracted, releasing position of the shank, wherein said at least one locking ball does not project from the shank,
   an extracted, locking position of the shank, wherein said at least one locking ball at least partially projects from the shank and is at least partially housed in a corresponding first housing seat formed in said substantially cylindrical housing seat of the shank,
   wherein said tool-holder unit comprises a driving element of said at least one locking ball comprising a driving stem, slidably mounted in axial direction in said tool-holder between:
      a first, locking position of the shank, wherein the driving stem urges said at least one locking ball in said extracted position in which the locking ball at least partially projects from the shank; and
      a second, releasing position of the shank, wherein said at least one locking ball is in said retracted position and is at least partially housed in a respective second housing seat (73a) formed in said driving stem;
   wherein the driving element of said at least a second axial locking element of the tool-holder comprises an actuation head fixed to an end portion of the driving stem externally positioned with respect to the housing seat of said shank and provided with an outer recess configured to be engaged by a maneuvering tool of the actuation head;
   wherein said storage stations include a fork-shaped element for supporting the tool-holder provided with said maneuvering tool; and
   wherein the driving stem is moved towards said second, releasing position of the shank, by engaging the maneuvering tool of the fork-shaped element for supporting the tool-holder in said outer recess of the actuation head of the driving element of said at least a second axial locking element of the tool-holder.

34. The method according to claim 33, wherein the maneuvering tool of the fork-shaped element for supporting the tool-holder is engaged in said outer recess of the actuation head by laterally inserting said actuation head in the fork-shaped element.

35. The method according to claim 33, wherein the maneuvering tool of the fork-shaped element comprises at least one arm of said fork-shaped element provided with a tapered end portion configured to engage in said outer recess of the actuation head of the driving element.

\* \* \* \* \*